United States Patent
Dickson et al.

(10) Patent No.: US 8,537,466 B2
(45) Date of Patent: Sep. 17, 2013

(54) HIGH DISPERSION DIFFRACTION GRATING INCLUDING MULTIPLE HOLOGRAPHIC OPTICAL ELEMENTS

(75) Inventors: LeRoy Dickson, Leeds, UT (US); Gerald Heidt, Logan, UT (US); Richard Rallison, Paradise, UT (US); Elroy Pearson, Logan, UT (US)

(73) Assignee: Wasatch Photonics, Inc., Logan, UT (US)

( * ) Notice: Subject to any disclaimer, the term of this patent is extended or adjusted under 35 U.S.C. 154(b) by 149 days.

(21) Appl. No.: 13/020,234

(22) Filed: Feb. 3, 2011

(65) Prior Publication Data

US 2011/0122469 A1 May 26, 2011

Related U.S. Application Data

(60) Division of application No. 11/423,371, filed on Jun. 9, 2006, now abandoned, which is a continuation-in-part of application No. 11/056,507, filed on Feb. 11, 2005, now Pat. No. 7,321,466.

(51) Int. Cl.
*G02B 5/18* (2006.01)

(52) U.S. Cl.
USPC ............................................. 359/569

(58) Field of Classification Search
USPC ................. 359/566, 569, 576; 398/84
See application file for complete search history.

(56) References Cited

U.S. PATENT DOCUMENTS

| 5,602,657 | A * | 2/1997 | Dickson et al. | 359/15 |
| 6,343,170 | B1 * | 1/2002 | Sela | 385/37 |
| 2003/0007201 | A1 * | 1/2003 | Dickson | 359/15 |
| 2003/0076594 | A1 * | 4/2003 | Kramer | 359/569 |

* cited by examiner

*Primary Examiner* — Alessandro Amari

(57) ABSTRACT

A multi-element diffraction grating is disclosed. The multi-element diffraction grating may be configured to diffract incident radiation with high dispersion using at least two holographic optical elements. The multi-element diffraction grating may include a first volume phase grating that is one of the holographic optical elements. The multi-element diffraction grating may also include at least one additional volume phase grating that is the second holographic optical element. The first volume phase grating and each of the additional volume phase gratings may be positioned relative to each other such that the radiation propagates through and is diffracted by the first volume phase grating and each of the additional volume phase gratings.

14 Claims, 27 Drawing Sheets

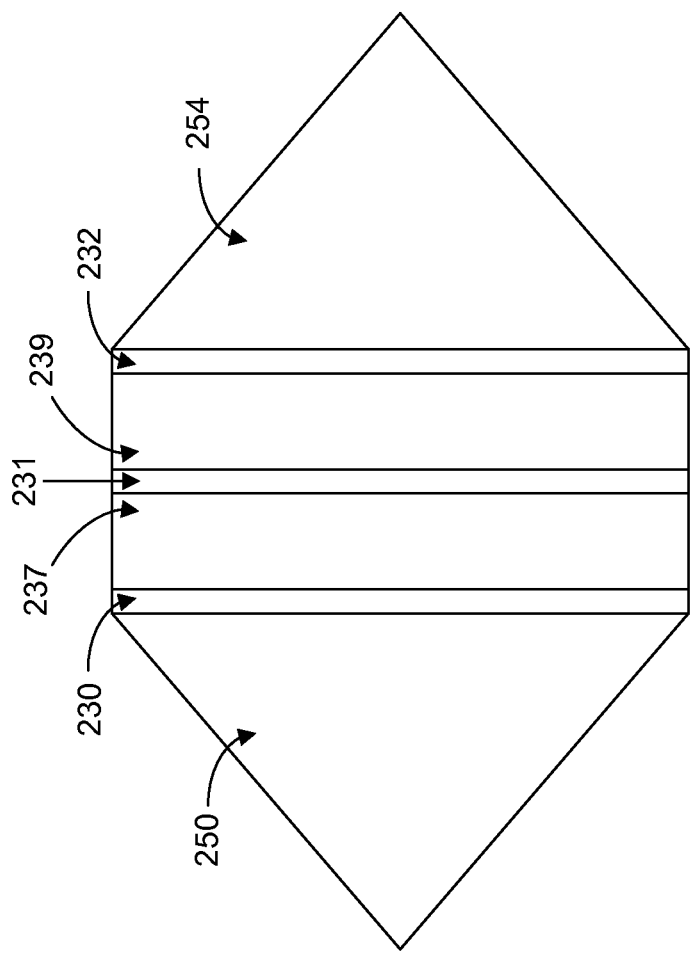

HIGH DISPERSION DIFFRACTION GRATING INCLUDING MULTIPLE HOLOGRAPHIC OPTICAL ELEMENTS

CROSS-REFERENCE TO RELATED APPLICATION

This application is a divisional of U.S. patent application Ser. No. 11/423,371, titled "High Dispersion Diffraction Grating Including Multiple Holographic Optical Elements," which was filed on Jun. 9, 2006, and which is a continuation-in-part of U.S. patent application Ser. No. 11/056,507, titled "High Dispersion Diffraction Grating Including Multiple Holographic Optical Elements," which was filed on Feb. 11, 2005.

TECHNICAL FIELD

The invention pertains to diffraction gratings (e.g., volume phase gratings implemented as holograms) and holographic optical elements ("HOEs"). In some embodiments, the invention is a diffraction grating that has high dispersion and includes multiple HOEs.

BACKGROUND

The telecommunications industry is growing rapidly as a result of the expanding need for the transmitting and receiving of greater amounts of information. The industry, in order to meet the needs of the market, has developed a number of technologies that make use of the inherent broadband capabilities of fiber optics. One of these technologies is Wavelength Division Multiplexing, or WDM.

WDM allows many signals to be transmitted simultaneously along a single optical fiber by sending each signal on a different carrier. Each carrier is a light beam of a slightly different wavelength than that of all of the other carriers. In order to combine these individual carrier beams into a single beam at the input of the fiber, an optical multiplexer (MUX) must be employed. To separate the carriers at the receiving end of the fiber, an optical de-multiplexer (DEMUX) must be employed. To be effective and economically practical, a MUX or a DEMUX must be capable of separating a multi-wavelength light beam into its individual wavelength components with a minimum amount of insertion loss and a minimum amount of Polarization Dependent Loss (PDL) and be relatively inexpensive and relatively compact.

The primary function of a DEMUX is to separate the carrier beams by wavelength. There are four basic means of providing this function: (1) thin film filters, (2) arrayed waveguides, (3) fiber Bragg gratings, and (4) diffraction gratings. Thin film filters use multiple filters, each tuned to a different wavelength. Separation occurs at each filter along the light propagation path. This method is effective for systems with a small number of channels (one channel corresponds to one carrier wavelength). For systems with large numbers of channels (e.g., 16 or more) thin film filters are not suitable because the insertion loss is excessive and the overall system becomes too complex.

Arrayed waveguides use an array of different length waveguides. A light beam consisting of multiple carriers, each at a different wavelength, exiting an input fiber is spread out so that it enters all of the waveguides in the array. The wavelength of each carrier in each waveguide, and the length of that waveguide, will determine its phase relative to the light of the same wavelength exiting all of the other waveguides. This phase relationship, in turn, will establish the overall phase distribution of the exiting wavefront for that particular wavelength. That phase distribution will then determine the output port to which this carrier wave will be directed.

Arrayed waveguides are very complex so that large arrays are difficult to make and some means of temperature control is generally required. This complexity places a practical upper limit on the number of channels that can be delivered with arrayed waveguides. Typically, arrayed waveguides also have high insertion loss.

Fiber Bragg gratings are similar to thin film filters except that the filtering is done by a grating created within the fiber. The wavelength selection is done at each grating within the fiber. Fiber Bragg gratings have the same insertion loss problem as thin film filters—the insertion loss becomes excessive for large numbers of channels and, as with thin film filters, the overall system becomes unacceptably complex for a large number of channels.

All three of the above technologies have a relatively high cost per channel as the number of channels increases.

The fourth technology, diffraction gratings, has the potential for both high performance (large number of channels and low insertion loss) and relatively low cost. A diffraction grating may provide separation of a large number of discrete wavelengths by the process of dispersion. An incident beam consisting of multiple carriers of different wavelengths is dispersed by diffraction as the beam is either reflected from the grating or transmitted through the grating. Each wavelength of the exiting beam is reflected or transmitted at a different angle of diffraction so that each carrier can enter a different port. This would be the case for a DEMUX. For a MUX, the separate carriers would be combined into a single beam in a process that is essentially the reverse of that described above for a DEMUX.

The obvious advantage of diffraction gratings over the three other technologies is that a single, relatively simple device may provide the complete wavelength separation function. Therefore, the cost, complexity and size of the MUX or DEMUX will all be less, yet the number of channels will be greater.

There are four types of diffraction gratings but only three are suitable for WDM applications: reflective and transmissive surface relief gratings, and transmissive volume phase gratings (transmissive "VPGs"). Surface relief gratings can have relatively high diffraction efficiencies, but generally only for one polarization. This creates a problem known as Polarization Dependent Loss ("PDL") in WDM where components of radiation incident on a diffraction grating have different polarizations, since these components will be diffracted by the grating with different diffraction efficiencies. While PDL cannot be eliminated in a surface relief grating, it can be minimized, although only at relatively low grating frequencies (roughly 600 lines per mm or less). This low grating frequency reduces the dispersion of the grating, making it more difficult to insert more channels and get good channel separation.

Transmissive VPGs can also have high diffraction efficiencies but, as in the case of surface relief gratings, this high diffraction efficiency generally occurs only for one polarization. Therefore, a conventional VPG typically exhibits high PDL. While PDL can be minimized in a conventional VPG, doing so either causes the overall diffraction efficiency to be low or the dispersion to be low, resulting in either unacceptably high insertion loss or relatively fewer available channels.

U.S. Pat. No. 6,750,995, issued Jun. 15, 2004, to LeRoy D. Dickson, discloses volume phase gratings (VPGs) configured to maximize both S-polarization diffraction efficiency and P-polarization diffraction efficiency (thereby minimizing insertion loss) and also to minimize polarization dependent loss (PDL). Herein, we will denote as a "Dickson grating" any VPG that is an "E-VPG" grating as described in U.S. Pat. No. 6,750,995. We will sometimes denote as a "non-Dickson grating" a VPG that is not a Dickson grating.

U.S. Pat. No. 6,750,995 teaches that the volume phase medium of a Dickson grating can be a hologram composed of dichromated gelatin ("DCG") having periodically modulated refractive index. However, U.S. Pat. No. 6,750,995 does not teach how to implement a Dickson grating with sufficiently high dispersion (and sufficiently small size and low manufacturing cost) for some applications. A diffraction grating having desirable characteristics of a Dickson grating (minimized PDL, and high diffraction efficiency for both S-polarized and P-polarized radiation) but which can be manufactured (at an acceptably low cost and with sufficiently small size) to have higher dispersion (for both S-polarized and P-polarized components) than can be achieved in accordance with the teachings of U.S. Pat. No. 6,750,995, would be useful in many WDM and other applications.

U.S. Pat. No. 5,602,657, issued Feb. 11, 1997, to LeRoy D. Dickson, et al. discloses a diffraction grating including multiple holographic optical elements (HOEs) held together by a transparent adhesive (e.g., optical cement). Each HOE is a volume phase grating including a volume hologram and a substrate. The multi-HOE grating is designed to diffract a beam including components having different polarizations (e.g., P-polarized and S-polarized components) to produce a desired angular separation between the diffracted components of the diffracted beam. For example, the multi-HOE grating can include a pair of volume phase gratings whose volume holograms have relative orientation such that when the multi-HOE grating diffracts a beam, the angular separation between P-polarized and S-polarized components of the diffracted beam exceeds a predetermined minimum value. However, U.S. Pat. No. 5,602,657 does not disclose how to implement a diffraction grating having high dispersion for both S-polarized and P-polarized components of incident radiation (e.g., incident radiation having a range of wavelengths), minimized PDL, and at least substantially uniformly high diffraction efficiency across a broad wavelength range of incident radiation for both S-polarized and P-polarized components of the incident radiation.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

FIG. 15A is a cross-sectional view of an embodiment of the inventive grating, including two prisms (250 and 254), a Dickson grating (237), and another VPG (239);

DETAILED DESCRIPTION

Figure 1:
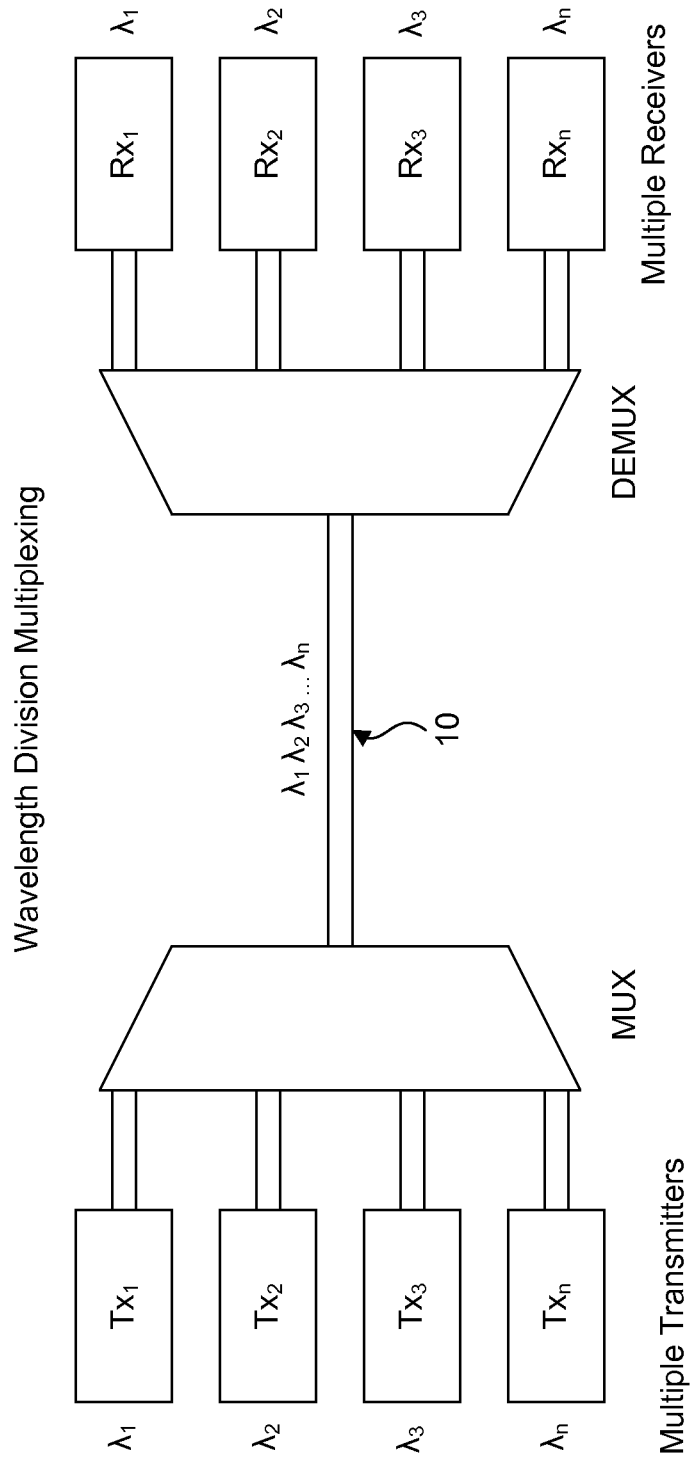
FIG. 1 is a diagram of the Wavelength Division Multiplexing portion of a telecommunications system.

In one embodiment, a multi-element diffraction grating is disclosed. The multi-element diffraction grating is configured to diffract incident radiation with high dispersion using at least two holographic optical elements. The multi-element diffraction grating includes a first volume phase grating that is one of the holographic optical elements. The multi-element diffraction grating also includes at least one additional volume phase grating. Each of the at least one additional volume phase gratings is another one of the holographic optical elements. The first volume phase grating and each of the additional volume phase gratings are positioned relative to each other such that the radiation propagates through and is diffracted by the first volume phase grating and each of the additional volume phase gratings.

Another embodiment of a multi-element diffraction grating is disclosed, which is configured to diffract incident radiation with high dispersion using two holographic optical elements. The multi-element diffraction grating includes a first volume phase grating that is the first holographic optical element. The multi-element diffraction grating includes a second volume phase grating that is the second holographic optical element. The first volume phase grating and the second volume phase grating are positioned relative to each other such that the radiation propagates through and is diffracted by the first volume phase grating and the second volume phase grating. The multi-element diffraction grating includes at least one wedge element.

An additional embodiment of a multi-element diffraction is disclosed, which is configured to diffract incident radiation with high dispersion using two holographic optical elements. The multi-element diffraction grating includes a first volume phase grating that is the first holographic optical element. The multi-element diffraction grating includes a second volume phase grating that is the second holographic optical element. The first volume phase grating and the second volume phase grating are positioned relative to each other such that the radiation propagates through and is diffracted by the first volume phase grating and the second volume phase grating. The multi-element diffraction grating includes at least one wave plate.

In some embodiments, the first volume phase grating and at least one of the additional volume phase gratings may be non-Dickson gratings. In other embodiments, the first volume phase grating and at least one of the additional volume phase gratings may be Dickson gratings.

The first volume phase grating and at least one of the additional volume phase gratings, in some embodiments, may have the same spatial frequency. In other embodiments, the first volume phase grating and at least one of the additional volume phase gratings may have different spatial frequencies.

The multi-element diffraction grating, in some embodiments, may include at least one wave plate. In some embodiments the at least one wave plate may be a half wave plate. In other embodiments, the at least one wave plate may be two quarter wave plates.

In some embodiments, the multi-element diffraction grating may include at least one wedge element. In other embodiments, the wedge element may be at least one prism. In still other embodiments, the prism may be made of fused silica.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

The term "transparent" is used herein with reference to an optical element (or component thereof) to denote transmissive to electromagnetic radiation that the optical element is designed to transmit and/or reflect.

The expression "high dispersion" is used herein with reference to the inventive multi-HOE grating (e.g., to indicate that an embodiment of the inventive grating is configured to diffract incident radiation with "high dispersion") to denote that the inventive grating diffracts incident radiation with greater dispersion than its constituent Dickson grating (or one of its constituent Dickson gratings) would diffract the same radiation.

In some embodiments, the invention is a diffraction grating having at least two holographic optical elements (HOEs). Some embodiments include a Dickson grating and at least one other volume phase grating (VPG). Other embodiments include multiple Dickson gratings. Still other embodiments include multiple non-Dickson gratings. In some embodiments, the refractive index modulations of the Dickson grating's volume phase medium should have significantly greater spatial frequency than do those of each other VPG of the inventive grating, to ensure that the inventive grating has high dispersion for both S-polarized and P-polarized components of incident radiation (e.g., incident radiation having a range of wavelengths), minimized PDL, and preferably also, uniformly (or substantially uniformly) high diffraction efficiency across a broad wavelength range of incident radiation for both S-polarized and P-polarized components of the incident radiation. In other embodiments, the refractive index modulations of the Dickson grating's volume phase medium have spatial frequency greater by at least a factor of two than do those of each other VPG of the inventive grating.

In some embodiments, the inventive grating not only has key desirable characteristics of a Dickson grating (minimized PDL, high S-polarization diffraction efficiency, and high P-polarization diffraction efficiency) but also may provide higher dispersion (for both S-polarized and P-polarized components of incident radiation) than can be achieved by a Dickson grating or an optical device including a single diffraction grating (e.g., a Dickson grating) and one or more non-grating elements. Typically, the elements of the inventive grating are coupled to each other by suitable transparent adhesive. Some embodiments of the inventive grating can be manufactured at an acceptably low cost, with a sufficiently small size, and with sufficiently high dispersion (for both S-polarized and P-polarized components) to be useful in many WDM (and other) applications requiring high dispersion.

In further embodiments, the inventive grating (sometimes referred to herein as a "multi-HOE" grating) can be implemented as either a symmetric or non-symmetric grating. The choice as to whether each constituent grating (Dickson grating or other VPG grating) of the inventive grating should be implemented as a symmetric or non-symmetric grating may depend on the specific intended use or uses of the inventive grating. A non-symmetric grating typically has an angle of diffraction (AOD) that is unequal to the angle of incidence (AOI) at the illumination geometry that may result in maximum diffraction efficiency. A symmetric grating has an AOD that is equal to the AOI at the illumination geometry that results in maximum diffraction efficiency.

In still further embodiments, the inventive multi-HOE grating may include only one Dickson grating, and the other holographic elements of the multi-HOE grating may not be Dickson gratings. In some embodiments, the inventive multi-HOE grating may include two or more Dickson gratings. For example, one embodiment may include two and only two VPGs, each of which is a Dickson grating. In other embodiments, the inventive multi-HOE grating may include two or more non-Dickson gratings. For example, one embodiment may include two and only two VPGs, each of which is a non-Dickson grating.

Although, in some embodiments, the presence of each VPG of the inventive multi-HOE grating (in addition to a first Dickson grating of the multi-HOE grating) may reduce the inventive grating's S-polarization and P-polarization diffraction efficiency below the S-polarization and P-polarization diffraction efficiency of the first Dickson grating alone, the inventive grating can typically be implemented with acceptable diffraction efficiency. By ensuring that the refractive index modulations of the first Dickson grating's volume phase medium have significantly greater spatial frequency than do those of each other VPG of the inventive grating, the inventive grating's PDL will not significantly differ from the (minimized) value of the first Dickson grating's PDL.

In some embodiments, the inventive grating may provide significantly higher (e.g., higher by a factor of 1.5 to 3.15) dispersion than each individual VPG thereof can provide, with minimized PDL, high S-polarization diffraction efficiency, and high P-polarization diffraction efficiency. For example, one such embodiment includes a Dickson grating whose volume phase medium has 940 index modulations per mm (i.e., the Dickson grating has a spatial frequency of 940 "lines per mm") and a non-Dickson VPG having a spatial frequency of 260 lines per mm, is designed for diffracting radiation having wavelengths in a range centered at 1545 nm, and may provide 7.43°/40 nm angular dispersion. This can be compared with the 3.00°/40 nm dispersion for a Dickson grating (designed for diffracting the same radiation) alone having spatial frequency of 940 lpmm.

The present invention may be useful for diffracting radiation having multiple wavelengths with adequate dispersion for many applications, including Dense Wavelength Division Multiplexing (DWDM) applications of the type common in the telecommunications industry.

In some embodiments, the inventive grating is a transmissive grating. In alternative embodiments, it is a reflective grating (for example, a reflective grating including at least one minor or mirrored prism). For example, a reflective embodiment of the inventive grating can include constituent gratings having transmissive volume phase media and at least one reflective element in the path of the diffracted beam, so as to be useful in a reflective, double pass mode. In such a double pass mode, the overall dispersion may be increased over that of a single-pass, transmissive version of the grating while still maintaining high overall diffraction efficiency and low PDL.

Each Dickson grating included in the inventive grating may be implemented to have uniformly (or substantially uniformly) high diffraction efficiency across a broad wavelength range (including a nominal wavelength) for all polarizations and is implemented (and oriented during use) with the bulk index and index modulation (and optionally also the thickness or effective thickness) of its volume phase grating material, and the angles of incidence and diffraction of the radiation to be diffracted thereby, having values such that its diffraction efficiency for both S-polarization and P-polarization are simultaneously maximized at the nominal wavelength. The volume phase material of each such Dickson grating may be created, coated, exposed and processed so as to obtain the desired values of the listed parameters. Each constituent grating of the inventive multi-HOE grating may be a holographic grating whose volume phase material is a hologram consisting essentially of dichromated gelatin ("DCG").

FIG. 1 is a block diagram of the Wavelength Division Multiplexing portion of a telecommunications system. The incoming beams from multiple sources ($Tx_1$, $Tx_2$, $Tx_3$, $Tx_n$) with corresponding multiple carrier wavelengths ($\lambda_1$, $\lambda_2$, $\lambda_3$, $\lambda_n$) are combined into a single beam in a multiplexer (MUX) and transmitted along a single optical fiber 10. At the receiving end of the fiber the de-multiplexer (DEMUX) breaks the single beam up into many beams, each of a different wavelength ($\lambda_1$, $\lambda_2$, $\lambda_3$, $\lambda_n$), corresponding to the wavelength of each of the carrier beams at the input to the MUX. These beams are then directed to the corresponding receptor elements ($Rx_1$, $Rx_2$, $Rx_3$, $Rx_n$). A diffraction grating that embodies the present invention can perform the wavelength combining function of the MUX. Another diffraction grating that embodies the present invention can perform the wavelength separation function of the DEMUX.

Figure 2:
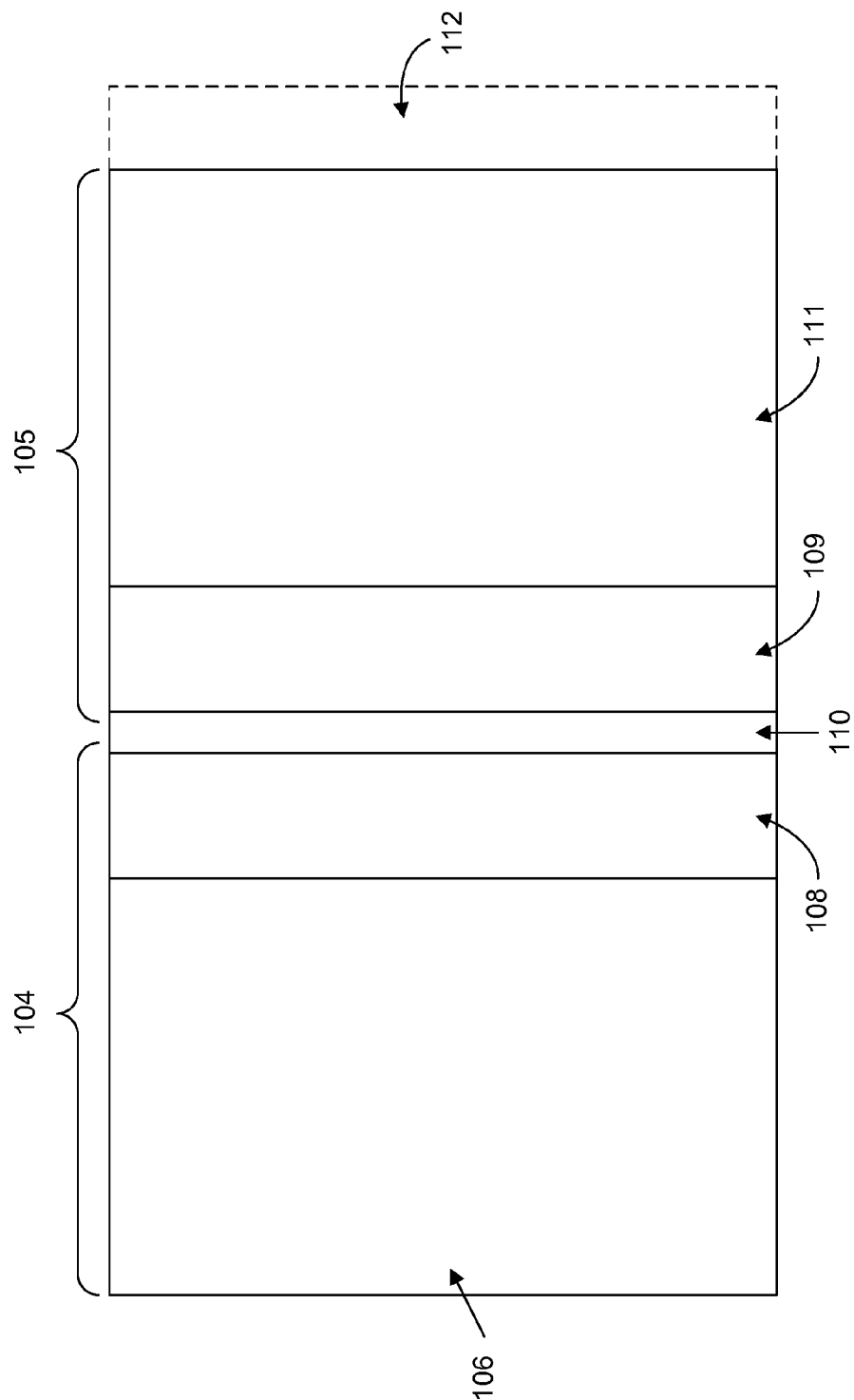
FIG. 2 is a cross-sectional view of an embodiment of the inventive grating.

FIG. 2 is a cross-sectional view of an embodiment of the inventive grating that includes Dickson grating 104 (comprising substrate 106 and volume phase medium 108), VPG 105 (comprising substrate 111 and volume phase medium 109), and transparent, index matched glue (or other transparent, index matched adhesive) 110 between medium 108 and medium 109. Each of media 108 and 109 is a hologram composed of dichromated gelatin ("DCG") having a periodically modulated refractive index. Grating 105 is a non-symmetric grating. Dickson grating 104 is a non-symmetric grating having significantly greater (e.g., greater by at least a factor of 2, in a class of embodiments) spatial frequency than does grating 105, in the sense that volume phase medium 108 has refractive index modulations of significantly greater spatial frequency than the spatial frequency of the refractive index modulations of grating 105's volume phase medium 109. The FIG. 2 grating may provide more dispersion than can be provided by grating 104 alone (or by a Dickson grating that is thicker than but otherwise identical to grating 104) without the need for a prism. The FIG. 2 grating can be manufactured with relaxed manufacturing parameters (relative to those for more complicated gratings, e.g., those including one or more prisms) due to its low Fresnel reflection losses for both S- and P-polarized radiation.

The FIG. 2 grating can be oriented so that the radiation to be dispersed thereby is incident either at either substrate 106 (in which case we refer to grating 104 as the "first" grating and grating 105 as the "last" grating) or substrate 111 (in which case we refer to grating 105 as the "first" grating and grating 104 as the "last" grating). The Bragg planes of the media 108 and 109 typically should have relative orientation such that the exit beam angle of the first grating matches the entrance beam angle of the last grating. If it is desired that the exit beam aspect ratio is the same as that of the entrance beam, the exit beam angle of the last grating should match the entrance beam angle of the first grating.

Note that in typical embodiments of the inventive multi-HOE grating (including typical implementations of the FIG. 2 embodiment), the Bragg planes of the first VPG and last VPG typically should have relative orientation such that the entrance beam angle of the first VPG matches the exit beam angle of the last VPG (to ensure that the inventive multi-HOE grating does not change the beam aspect ratio), and also such that the exit beam angle of the first VPG matches the entrance beam angle of the last VPG.

In an exemplary implementation of the FIG. 2 grating, Dickson grating 104 has a spatial frequency of 940 lines per mm, grating 105 has a spatial frequency of 200 lines per mm, the s and p integers (described below) for Dickson grating 104 are selected so that internal angle of diffraction β satisfies below-discussed equation (6), and the FIG. 2 grating may provide at least as much dispersion as a Dickson grating (designed for diffracting the same radiation) having a spatial frequency of 1140 lines per mm.

More generally, a typical embodiment of the inventive grating that includes a Dickson grating having spatial frequency "A" lines per mm (in the sense that the refractive index modulations of the Dickson grating's volume phase medium have spatial frequency "A" lines per mm) and one other VPG having spatial frequency "B" lines per mm, with the VPG in "contact with" (bonded "directly to") the Dickson grating in the sense that only a layer of transparent adhesive having uniform or substantially uniform thickness separates the two gratings from each other, may provide at least as much dispersion as a single VPG (designed and configured for diffracting the same radiation) having a spatial frequency equal (or substantially equal) to (A+B) lines per mm. In order for such embodiment of the inventive grating to have PDL that does not differ significantly from the (minimized) value of its constituent Dickson grating's PDL, the Dickson grating's spatial frequency "A" should be significantly greater than the other constituent grating's spatial frequency "B." In some embodiments, the spatial frequencies "A" and "B" satisfy the relation B=(A/3). In other embodiments, the Dickson grating's spatial frequency "A" is not significantly greater than the other constituent grating's spatial frequency "B" (for example, A=902 and B=448 in one embodiment, and A=B=780.5 in another embodiment).

In a variation on the FIG. 2 embodiment, the inventive grating can be implemented as a reflective grating if the optional mirror 112 (shown in phantom view in FIG. 2) is affixed to element 111 as shown, to make the grating useful in a reflective, double pass mode in which radiation propagates through elements 104 and 105, then reflects from minor 112, and then propagates back through elements 105 and 104.

Figure 3:
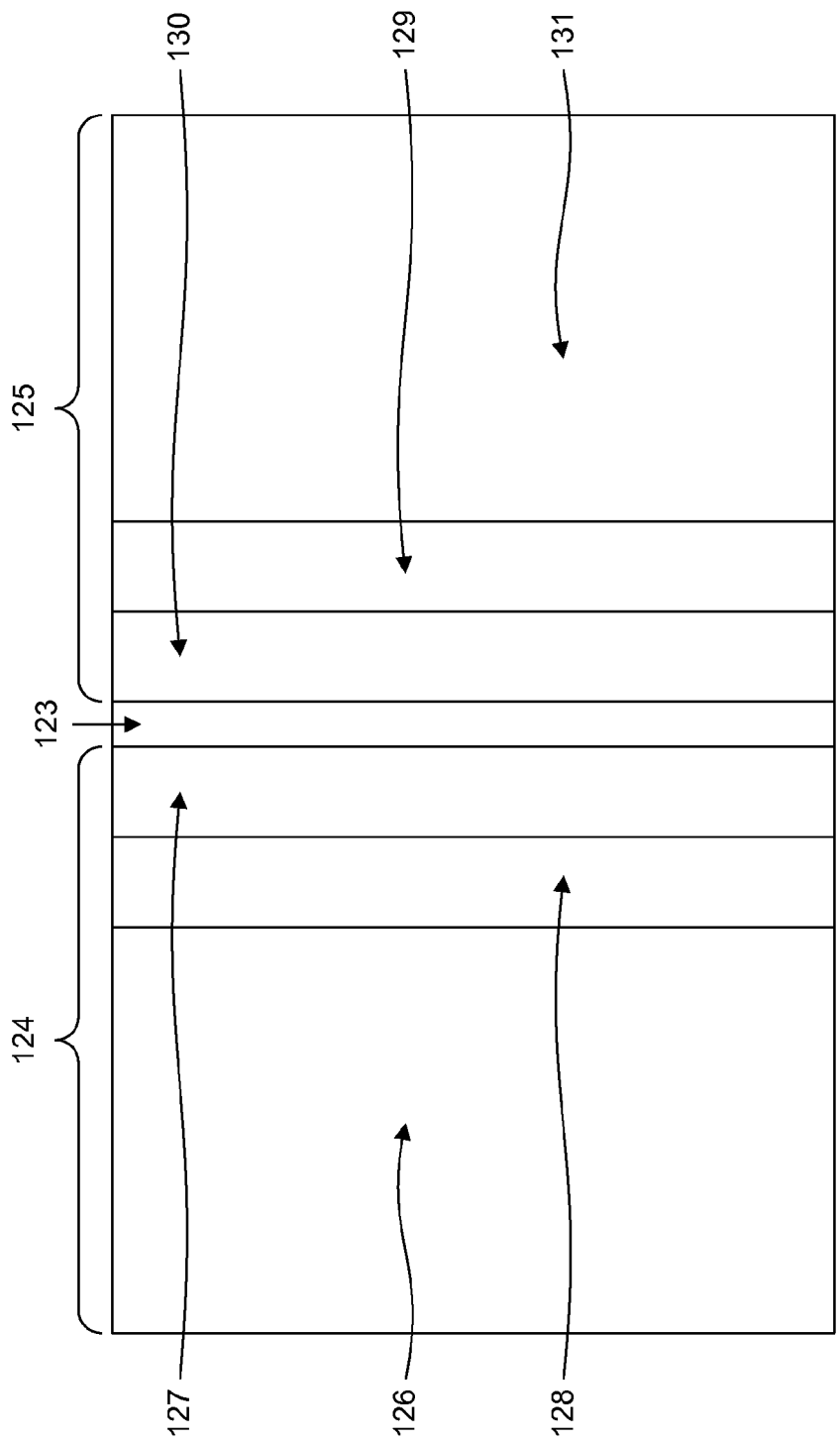
FIG. 3 is a cross-sectional view of another embodiment of the inventive grating.

FIG. 3 is a cross-sectional view of another embodiment of the inventive grating that includes Dickson grating 124 (comprising substrate 126, volume phase medium 128, and flat cap 127), VPG 125 (comprising substrate 131, volume phase medium 129, and flat cap 130), and transparent, index matched glue (or other transparent, index matched adhesive) 128 between caps 127 and 130. Each of media 128 and 129 is a hologram composed of dichromated gelatin ("DCG") having a periodically modulated refractive index. Grating 125 is a non-symmetric, low spatial frequency grating. Dickson grating 124 is a non-symmetric grating having high spatial frequency, in the sense that volume phase medium 128 has refractive index modulations of greater spatial frequency than the spatial frequency of the refractive index modulations of grating 125's volume phase medium 129. Caps 127 and 130 are flat, transparent elements, which consist of fused silica in typical implementations.

The FIG. 3 grating can be oriented so that the radiation to be dispersed thereby is incident at either substrate 126 (in which case we refer to grating 124 as the "first" grating and grating 125 as the "last" grating) or substrate 131 (in which case we refer to grating 125 as the "first" grating and grating 124 as the "last" grating). The Bragg planes of media 128 and 129 typically should have relative orientation such that the exit beam angle of the first grating matches the entrance beam angle of the last grating. If it is desired that the exit beam aspect ratio is the same as that of the entrance beam, the exit beam angle of the last grating should match the entrance beam angle of the first grating.

Figure 4:
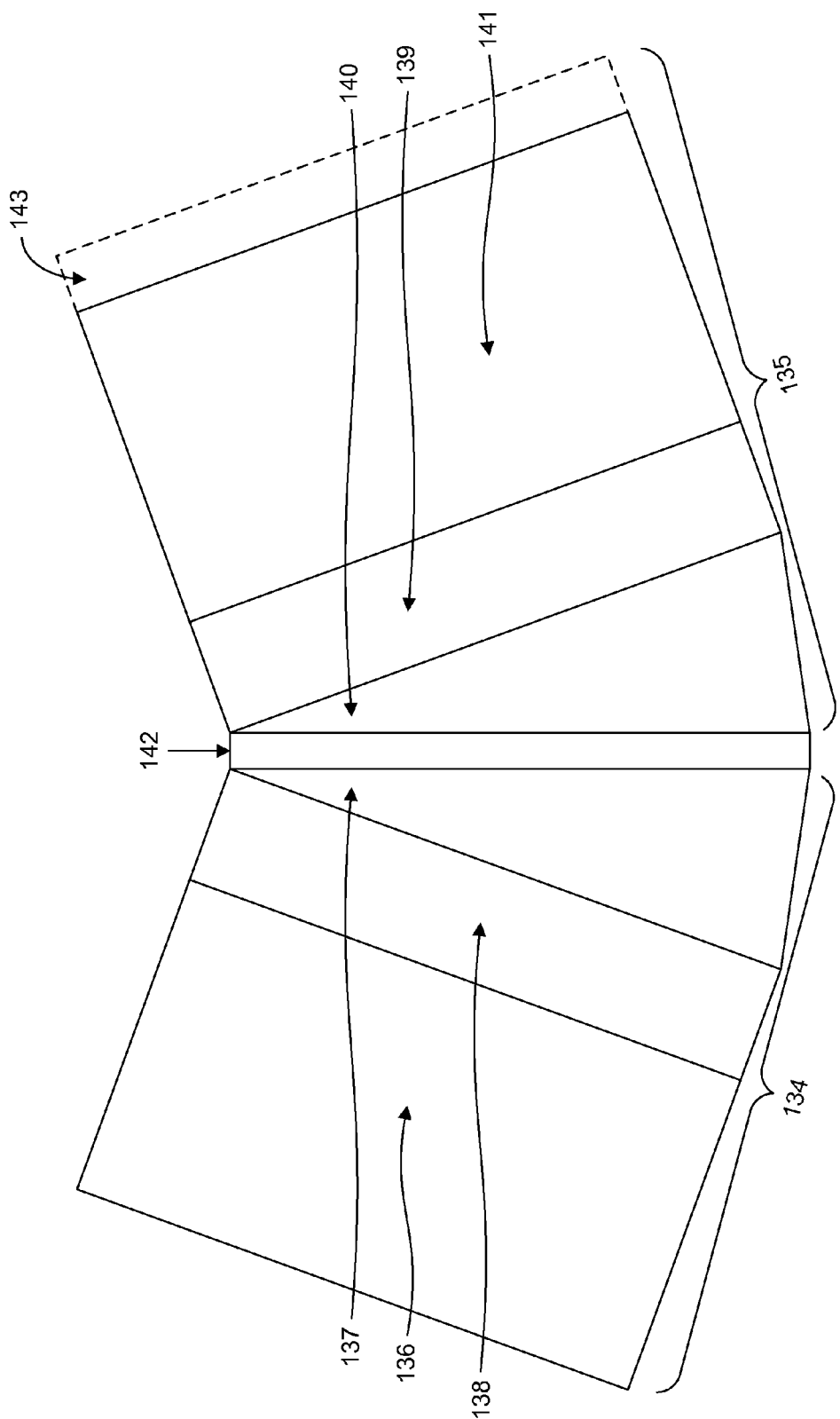
FIG. 4 is a cross-sectional view of another embodiment of the inventive grating.

FIG. 4 is a cross-sectional view of another embodiment of the inventive grating that includes Dickson grating 134 (comprising substrate 136, volume phase medium 138, and capping prism 137), VPG 135 (comprising substrate 141, volume phase medium 139, and capping prism 140), and transparent, index matched glue (or other transparent, index matched adhesive) 142 between prisms 137 and 140. Each of media 138 and 139 is a hologram composed of dichromated gelatin ("DCG") having a periodically modulated refractive index. Grating 135 is a non-symmetric, low spatial frequency grating. Dickson grating 134 is a non-symmetric grating having high spatial frequency, in the sense that volume phase medium 138 has refractive index modulations of greater spatial frequency than the spatial frequency of the refractive index modulations of grating 135's volume phase medium 139. Capping prisms 137 and 140 are transparent, and consist of fused silica in typical implementations.

The FIG. 4 grating can be oriented so that the radiation to be dispersed thereby is incident at either substrate 136 (in which case we refer to grating 134 as the "first" grating and grating 135 as the "last" grating) or substrate 141 (in which case we refer to grating 135 as the "first" grating and grating 134 as the "last" grating). The Bragg planes of media 138 and 139 typically should have relative orientation such that the exit beam angle of the first grating matches the entrance beam angle of the last grating. If it is desired that the exit beam aspect ratio is the same as that of the entrance beam, the exit beam angle of the last grating should match the entrance beam angle of the first grating.

Figure 5:
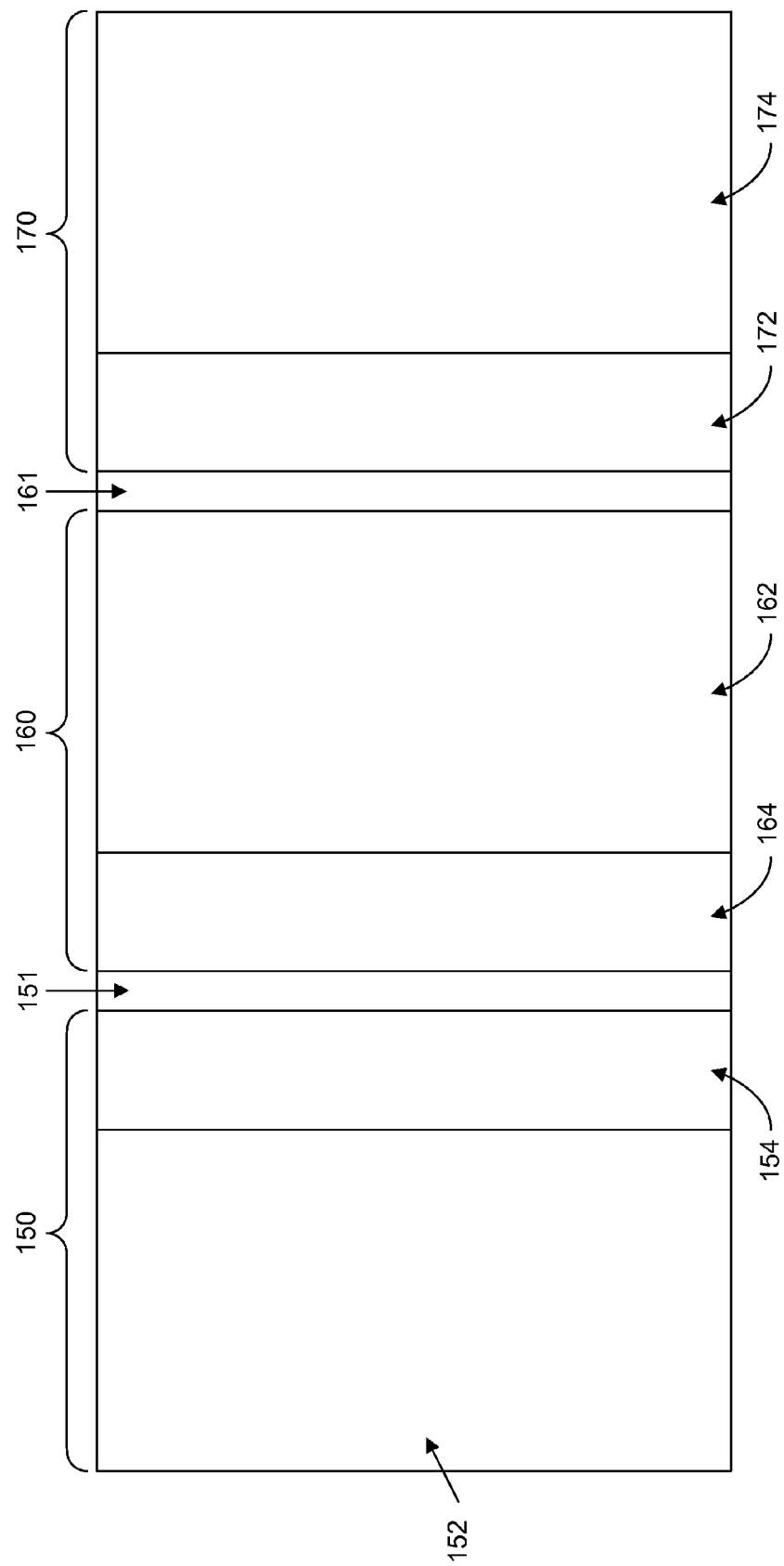
FIG. 5 is a cross-sectional view of another embodiment of the inventive grating.

FIG. 5 is a cross-sectional view of another embodiment of the inventive grating that includes VPG 150 (comprising substrate 152 and volume phase medium 154), Dickson grating 160 (comprising substrate 162 and volume phase medium 164), VPG 170 (comprising substrate 174 and volume phase medium 172), transparent, index matched glue (or other transparent, index matched adhesive) 151 between medium 154 and medium 164, and transparent, index matched glue (or other transparent, index matched adhesive) 161 between substrate 162 and medium 172. Each of media 154, 164, and 172 is a hologram composed of dichromated gelatin ("DCG") having a periodically modulated refractive index.

The FIG. 5 grating can be oriented so that the radiation to be dispersed thereby is incident either at substrate 152 (in which case we refer to grating 150 as the "first" grating and grating 170 as the "last" grating) or substrate 174 (in which case we refer to grating 170 as the "first" grating and grating 150 as the "last" grating). The Bragg planes of media 154, 164, and 172 typically should have relative orientation such that the exit beam angle of the first grating matches the entrance beam angle of grating 160 and the exit beam angle of grating 160 matches the entrance beam angle of the last grating. If it is desired that the exit beam aspect ratio is the same as that of the entrance beam, the exit beam angle of the last grating should match the entrance beam angle of the first grating.

FIG. 15A is a cross-sectional view of an embodiment of the inventive grating including prisms 250 and 254, Dickson grating 237, VPG 239, transparent, index matched glue 230 between prism 250 and grating 237, transparent, index matched glue 231 between gratings 237 and 239, and transparent, index matched glue 232 between grating 239 and prism 254. Each of gratings 237 and 239 is a hologram composed of dichromated gelatin ("DCG") having a periodically modulated refractive index. Grating 239 is a non-symmetric grating. Dickson grating 237 is a non-symmetric grating having significantly greater spatial frequency than does grating 239, in the sense that its refractive index modulations have greater spatial frequency than the spatial frequency of the refractive index modulations of grating 239. Prisms 250 and 254 are transparent and consist of fused silica in typical implementations. In some but not all implementations, prisms 250 and 254 of FIG. 15A are minor images of each other (with identical prism angles and refractive indices).

In one implementation, Dickson grating 237 of FIG. 15A has a spatial frequency of 902 lines per mm and grating 239 has a spatial frequency of 448 lines per mm. This implementation may provide at least as much dispersion as (and has insertion loss and PDL less than) a single Dickson grating having a spatial frequency of 1350 lines per mm and which is designed for diffracting the same radiation and so that its internal angle of diffraction β satisfies equation (7). The theoretical worst case PDL of such combination of a 902 lpmm Dickson grating and a 448 lpmm is 0.06 dB, whereas the theoretical worst case PDL of a 940 line per mm Dickson grating is about 0.05 dB and the theoretical worst case PDL of a 1350 line per mm Dickson grating is about 0.22 dB. The spatial frequency values of 902 lpmm and 448 lpmm for gratings 237 and 239 in this implementation are determined by the overall device geometry, which is such that the angle of diffraction (for radiation diffracted by grating 237) is less than the angle at which the radiation is incident at grating 237.

In another implementation, Dickson grating 237 of FIG. 15A has a spatial frequency of 780.5 lines per mm and grating 239 is also a Dickson grating having spatial frequency of 780.5 lines per mm. In this implementation, the volume phase medium of each of gratings 237 and 239 has a post-process, bulk refractive index at least substantially equal to 1.32 (or greater) and a Bragg plane tilt relative to the surface normal of about 35 degrees, and each of prisms 250 and 254 is composed of fused silica. The PDL of this implementation is about the same as that of a double-pass symmetric Dickson grating with the external minor normal to the exiting beam. This implementation may provide at least as much dispersion as a single volume phase grating having a spatial frequency of 1561 lines per mm.

In a variation on the implementation described in the previous paragraph, grating 237 and glue 231 are omitted, and a mirror is glued to the lower right surface of prism 254. In this variation (in which Dickson grating 239 preferably has a spatial frequency of 780.5 lines per mm), the overall device is useful in a reflective, double pass mode in which radiation propagates through elements 250, 239, and 254, then reflects from the mirror, and then propagates back through elements 254, 239, and 250 (exiting the device from prism 250).

Various implementations of FIG. 15A (and other embodiments of the inventive grating that include a Dickson grating and one other volume phase grating bonded directly thereto) are designed to provide the same dispersion that can be provided by a single VPG (designed and used for diffracting the same radiation) having a spatial frequency of (A+B) lines per mm. Each such embodiment of the inventive multi-HOE grating includes a Dickson grating having spatial frequency "A" lines per mm and another volume phase grating having spatial frequency "B" lines per mm. The ratio A/B decreases as the value of (A+B) increases (e.g., the ratio A/B decreases to one as the value of (A+B) increases to 1561).

In these implementations, the two gratings are in contact with (bonded directly to) each other in the sense that only a layer of transparent adhesive having uniform or substantially uniform thickness separates the two gratings from each other, with $\theta_1$=the entrance beam angle to the first one of the two gratings (the "first grating"), $\theta_2$=the exit beam angle from the first grating, $\theta_3$=the entrance beam angle to the last one of the two gratings (the "last grating"), and $\theta_4$=the exit beam angle from the last grating, with:

$$\theta_3 = -\theta_2 \tag{E1}$$

It follows from the grating equation (a well-known equation) for the first grating that:

$$\lambda f_1 = \sin\theta_1 + \sin\theta_2 \tag{E2},$$

where $f_1$ is the spatial frequency of the first grating.

It follows from the grating equation (also a well-known equation) for the last grating that:

$$\begin{aligned}\lambda f_2 &= \sin\theta_3 + \sin\theta_4 & \text{(E3)}\\ &= -\sin\theta_2 + \sin\theta_4 & \text{from eq. (E1)}\\ &= \sin\theta_1 - \lambda f_1 + \sin\theta_4 & \text{from eq. (E2)},\end{aligned}$$

where $f_2$ is the spatial frequency of the last grating.

Thus:

$$\lambda(f_1+f_2) = \sin\theta_1 + \sin\theta_4 \tag{E5}$$

and $$\lambda(f_{eq}) = \sin\theta_1 + \sin\theta_4 \tag{E6}$$

where $$f_{eq} = f_2 + f_2.$$

If the exit beam aspect ratio is to be the same as the entrance beam aspect ratio then $\theta_1 = \theta_4$ and:

$$\lambda(f_{eq}) = 2\sin\theta_1 = 2\sin\theta_4 \tag{E7}$$

The typical design process for implementations of FIG. 15A in the general category being described with reference to immediately preceding equations (E1)-(E7), assuming that the first grating of each such implementation is a Dickson grating, is as follows:

1. Determine the spatial frequency desired for the final dual-grating package. That is $f_{eq}$.
2. Calculate $\theta_1$ using Equation (E7). This assumes that we do not want to change the aspect ratio. If we want to change the aspect ratio we will have to calculate the desired ratio of the angles, from which we can determine $\theta_1$ and $\theta_4$.
3. Determine (from well-known properties of Dickson gratings coupled with prisms, including Fresnel reflection losses) the spatial frequency of the Dickson grating and the exit angle, $\theta_2$.
4. Determine that the entrance angle for the last grating is $-\theta_2$, from equation (E1), determine the exit angle $\theta_4$.
5. Apply the grating equation to the last grating, using the two angles $-\theta_2$ and $\theta_4$ as the entrance and exit angles, to calculate the spatial frequency, $f_2$ for the last grating.
6. Check to see that $f_1 + f_2 = f_{eq}$.

The FIG. 15A grating can be oriented so that the radiation to be dispersed thereby is incident either at prism 250 (in which case we refer to grating 237 as the "first" grating and grating 239 as the "last" grating) or prism 254 (in which case we refer to grating 239 as the "first" grating and grating 237 as the "last" grating). The Bragg planes of gratings 237 and 239 typically should have relative orientation such that the exit beam angle of the first grating matches the entrance beam angle of the last grating. If it is desired that the exit beam aspect ratio is the same as that of the entrance beam, the exit beam angle of the last grating should match the entrance beam angle of the first grating.

In various embodiments of the inventive multi-HOE grating, the constituent Dickson and non-Dickson gratings can be symmetric or non-symmetric gratings. However, in embodiments of the inventive grating that include a Dickson grating bonded directly to a non-Dickson grating, these two constituent gratings may be non-symmetric gratings. Either a Dickson or non-Dickson grating of the inventive multi-HOE grating can be the first constituent grating of the inventive grating to receive the radiation to be dispersed by the inventive grating. In typical embodiments of the inventive multi-HOE grating, each non-Dickson grating has lower spatial frequency than does each Dickson grating, but this is not the case in all embodiments of the invention.

Various embodiments of the inventive multi-HOE grating have one or more of the following features:

(a) the inventive grating includes two non-Dickson gratings having relatively low spatial frequency and a non-symmetric Dickson grating having greater spatial frequency, in an arrangement in which one non-Dickson grating asserts diffracted radiation to the Dickson grating and the Dickson grating asserts further-diffracted radiation to the other non-Dickson grating;

(b) the inventive grating includes at least one prism (or other wedge part) in place of or in addition to a non-Dickson grating of another embodiment of the inventive grating (e.g. to enhance manufacturability);

(c) in the inventive grating, the characteristics of one or both of a non-Dickson grating and a non-symmetric Dickson grating are adjustable to accommodate a wide range of very high dispersive configurations;

(d) the inventive grating includes one or more reflective elements (e.g., the inventive grating has a reflection geometry and includes at least one minor or mirrored prism). For example, the FIG. 4 embodiment of the inventive grating can be implemented as a reflective grating if the optional mirror 143 (shown in phantom view in FIG. 4) is affixed to element 141 as shown, to make the grating useful in a reflective, double pass mode in which radiation propagates through elements 134, 142, and 135, then reflects from mirror 143, and then propagates back through elements 135, 142, and 134. For another example, the FIG. 15A embodiment of the inventive grating can be implemented as a reflective grating if a mirror is affixed to the appropriate outer surface of prism 254 to make the FIG. 15A grating useful in a reflective, double pass mode;

(e) the inventive grating includes any of a variety of combinations of HOEs, selected to alter the diffracted beam shape and/or its exit direction. For example, the inventive grating can be implemented to receive an elliptical input beam and reshape it to a circular output beam; and (f) the inventive grating has an in-line geometry (e.g., of the type used in spectrometers) known as prism/grating/prism (PGP), to reduce undesirable "smile" and "keystoning" effects.

It is contemplated that some implementations of the inventive grating may include at least one Dickson grating (and/or at least one non-Dickson grating) whose volume phase medium has index modulation greater than that typical in the art (e.g., increased index modulation produced by a process in which the starting bulk index of the volume phase medium is increased above the value typical in the art). It is also contemplated that some implementations of the inventive grating may include optimized antireflection (AR) coatings for various parameters that may relax manufacturing tolerances.

The inventive multi-HOE grating can be implemented to have all (or any desired subset) of the following features:

(a) very high dispersion (to allow devices and systems including it to be more compact and allow for easier individual wavelength handling);

(b) very high S & P polarization diffraction efficiencies (to make the most effective use of the available radiation and minimize the need for additional devices);

(c) very low polarization dependent losses (i.e., polarization insensitivity) so that the polarization state of the incoming radiation does not matter (this is especially important in the many systems in which the polarization state(s) of the incoming radiation is (are) not known a priori, cannot be controlled, and/or is (are) variable);

(d) wide/flat bandwidth of operation to accommodate any single set of application parameters;

(e) wide design bandwidth to accommodate varied sets of application parameters;

(f) athermal performance (no, or insignificant, variability with temperature and humidity);

(g) rugged construction (product can be handled easily, and cannot easily be scratched or contaminated);

(h) minimal stray light (does not add any noise effects);

(i) preserves incoming/outgoing beam shape (aspect ratio) characteristics if required (e.g., does not alter a circular beam into an elliptical beam thereby possibly increasing the difficulty of efficiently aiming/coupling the diffraction beam into optical fibers);

(j) eliminates or reduces prism use to decrease size requirements and manufacturing costs;

(k) minimizes surfaces for ease of manufacturing, reducing Fresnel reflections, and reducing higher diffraction orders;

(l) reduces any etalon/resonating effects arising from parallel surfaced parts;

(m) small component size (i.e., does not increase the size of the device in which it is installed);

(n) easily integratable (can be designed and manufactured into many electro-optic systems);

(o) affordable (manufacturable with low cost);

(p) reduces device/system costs (component reduces other costs associated with the device/system or its maintenance);

(q) multiple functionality (capable of more easily providing two or more optical functions in one grating device); and (r) enables new applications not otherwise possible due to some or all of the above.

Figure 6:
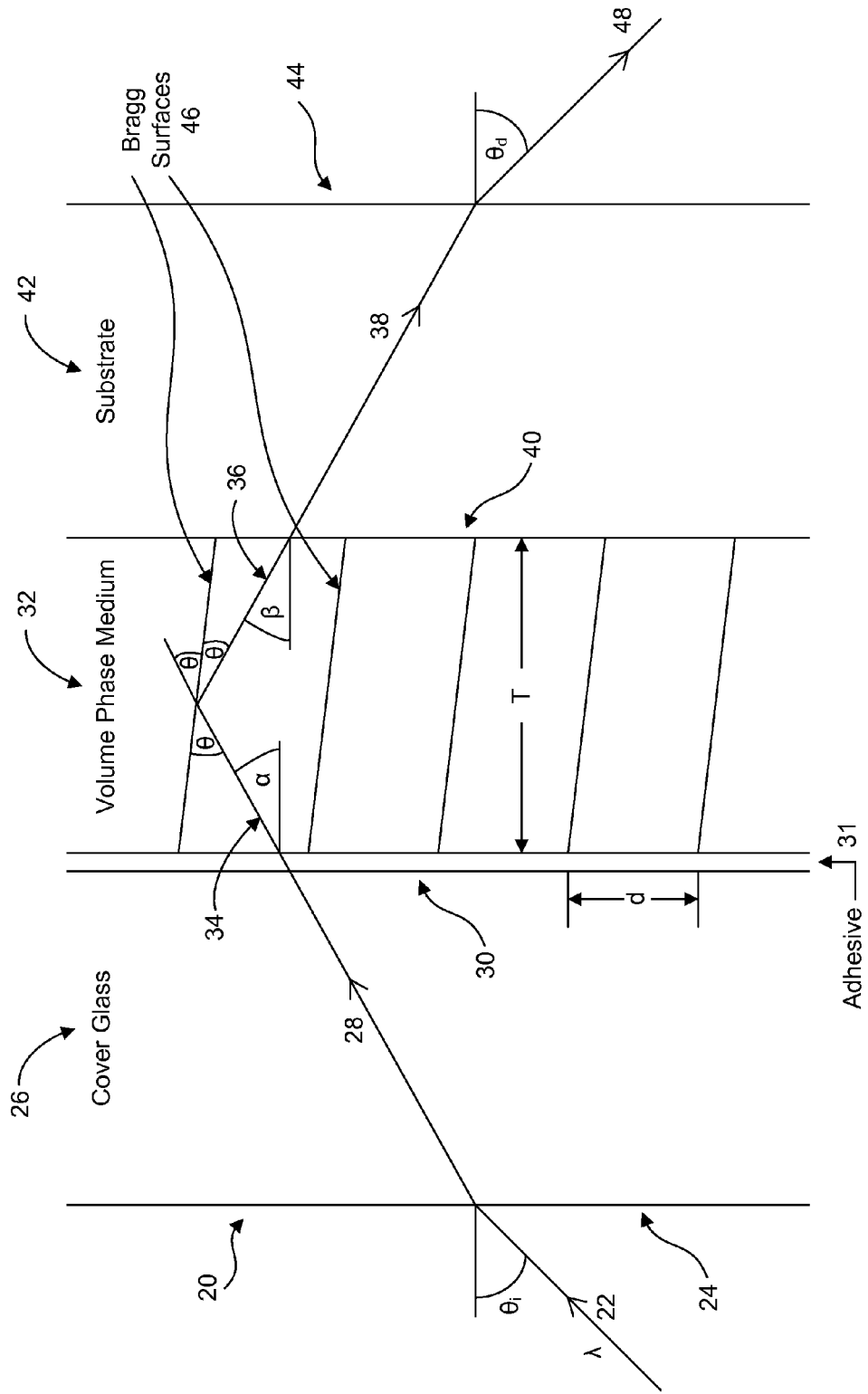
FIG. 6 is a cross-sectional view of an embodiment of a Dickson grating that is an element of some embodiments of the grating of the present invention.

FIG. 6 is a cross-sectional view of a transmissive Dickson grating (identified by reference number 20) that can be used in a class of embodiments of the invention (e.g., as grating 125 of FIG. 3). Incident beam 22, with a free space wavelength 2 is incident on first surface 24 of grating 20's cover glass 26 at an angle of incidence (relative to the normal to surface 24) of $\theta_i$ degrees. Upon entering cover glass 26, the beam is refracted in accordance with the well-known Snell's law of refraction. The refracted beam 28 propagates to the interface surface 30 between cover glass 26 and volume phase medium 32, where it is again refracted in accordance with Snell's law. This further refracted beam (beam 34) propagates in volume phase medium 32 at an angle of refraction $\alpha$ relative to the normal to the interface surface 30.

Within volume phase medium 32 there is a periodic modulation of refractive index $\Delta n$. The surfaces of maximum refractive index are called the Bragg surfaces 46. The period of this modulation, measured along the interface surface 30, is designated as d. A portion of beam 34 that is diffracted within volume phase medium 32 is identified as diffracted beam 36. Beam 34 is diffracted within phase medium 32 in accordance with the grating equation:

$$\lambda/nd = \sin \alpha + \sin \beta$$

where $\lambda$ is the free space wavelength of the incident beam, d is the grating spacing measured along the interface surface 30, n is the average bulk refractive index of the volume phase medium 32, $\alpha$ is the angle of the incident beam 34 within the volume phase medium 32 relative to the normal to the interface surface 30 and $\beta$ is the angle of the diffracted beam 36 within the volume phase medium 32 relative to the normal to the second interface surface 40. The effective thickness of volume phase medium 32 is T.

The diffracted beam 36 will be refracted at the interface surface 40 between the volume phase medium 32 and the substrate medium 42 in accordance with Snell's law and transmitted to the exit surface 44 of the substrate 42, where it will be once again refracted in accordance with Snell's law and will exit the substrate 42 at an angle $\theta_d$ relative to the normal to the exit surface 44.

In the special, but most common, case where the four surfaces 24, 30, 40 and 44 are plane surfaces parallel to each other and the refractive indexes of the external entrance medium and the external exit medium are the same, then the grating equation can be written as:

$$\lambda/n_0 d = \sin \theta_i + \sin \theta_d$$

where $n_0$ is the refractive index of the entrance/exit medium.

The angle between the internal incident beam 34 and the Bragg surfaces 46 within volume phase medium 32 is designated as $\theta$. When the angle between the internal diffracted beam 36 and the Bragg surfaces 46 within the volume phase medium 32 is also $\theta$, then the Bragg condition is said to be satisfied. In the example shown in FIG. 6, the internal angle of incidence, $\alpha$, is not equal to the internal angle of diffraction, $\beta$. Therefore the Bragg surfaces will be tilted (not normal to surfaces 30 and 40) as indicated in FIG. 6.

In embodiments of the present invention that are useful for WDM applications in which the inventive grating receives (and disperses) radiation having a broad range of wavelengths, the incident beam wavelength, $\lambda$, that is assumed in designing the inventive grating is the nominal, or center, wavelength of one of the telecommunications bands. One such communication band is the C band, whose center wavelength is approximately 1546 nm and whose bandwidth is approximately 37 nm. The external angle of diffraction for the center wavelength is $\theta_d$. The angle of diffraction for other wavelengths of the particular telecommunications band will be greater than or less than $\theta_d$, in accordance with the grating equation.

Dickson grating 20 can be implemented as a holographic grating whose volume phase medium 32 is dichromated gelatin (DCG) or other VPG material. Any of several volume phase materials can be used but DCG is well suited for the construction of a Dickson grating because it is capable, when properly exposed and processed, of providing very high modulation of the index of refraction, a key requirement for a good Dickson grating.

Still with reference to FIG. 6, substrate material 42 on which volume phase medium 32 is coated can be glass, fused silica, or one of any number of other well known transparent materials. The choice of the substrate material will generally be determined by the thermal expansion requirements. Volume phase medium 32 is typically sandwiched between two pieces of the transparent material (e.g., substrate 42 of FIG. 6, and cover, or capping, medium 26 of FIG. 6) and secured with a transparent optical adhesive, which also acts as a sealant to protect the DCG comprising medium 32 from the environment. Cover medium 26 can be glass, fused silica, or one of any number of other well known transparent materials. Either or both of elements 26 and 42 are omitted in variations on the FIG. 6 design.

The theory of volume phase gratings is well known. Several theories exist but the one most applicable for thick gratings with moderate index modulation and relatively large angles of incidence and diffraction is the Kogelnik Coupled Wave Theory. While more sophisticated and precise theories exist, they are more complex and add little of significant value to the results obtained from the Kogelnik theory when the conditions are such that only the first order diffracted beam exists and the effective thickness of the medium is relatively large. These are the conditions that pertain to Dickson gratings.

The major VPG parameters in the Kogelnik theory are the average bulk refractive index, n, of the medium, the effective thickness, T, of the medium and the index modulation, $\Delta n$ of the medium. The entering and exiting beam parameters of interest are the angle of incidence, $\theta_i$, the angle of diffraction, $\theta_d$, and the polarization of the incoming beam. By convention, the polarization direction is defined as the direction of the electric field in the beam.

The polarization direction of an optical beam incident on an optical surface is generally defined relative to the plane of incidence, which is defined as the plane containing the chief ray of the incident beam and the normal to the surface at the point of incidence. If the polarization direction is perpendicular to the plane of incidence, the beam is said to be S-polarized, from the German word for perpendicular—Senkrecht. If the polarization direction lies in the plane of incidence, the beam is said to be P-polarized (P=parallel). If the beam is polarized in any other direction, its polarization can always be resolved into components in these two orthogonal directions. Therefore, knowing the effects on the beam of the VPG for both the S-polarization direction and the P-polarization direction will be sufficient to provide the effects for any random polarization direction.

The major parameters of interest in the Kogelnik theory are the S and P diffraction efficiencies, Es and Ep, where diffraction efficiency is defined as the ratio of the energy, or power, in the diffracted beam 48 to that in the incident beam 22, ignoring the Fresnel reflection losses.

The Kogelnik theory provides the S and P diffraction efficiencies of a VPG as functions of the product of the index modulation, $\Delta n$, and the effective thickness, T, of the medium. Generally, either effective thickness is assumed to be constant and $\Delta n$ is varied or $\Delta n$ is assumed to be constant and effective thickness is varied. In practice, the first approach is the most common—the effective thickness is assumed to be constant.

The effective thickness, T, is used instead of the physical thickness, Tp, because the index modulation, in general, is not constant throughout the depth of the medium. The exposing and chemical processing of many VPG materials, such as DCG, results in a decrease of $\Delta n$ with depth in the medium. It is well known in the art that this variation can be taken into account by using an effective thickness that is less than the physical thickness and then using the assumption that the $\Delta n$ is constant over this reduced effective thickness.

Figure 7:
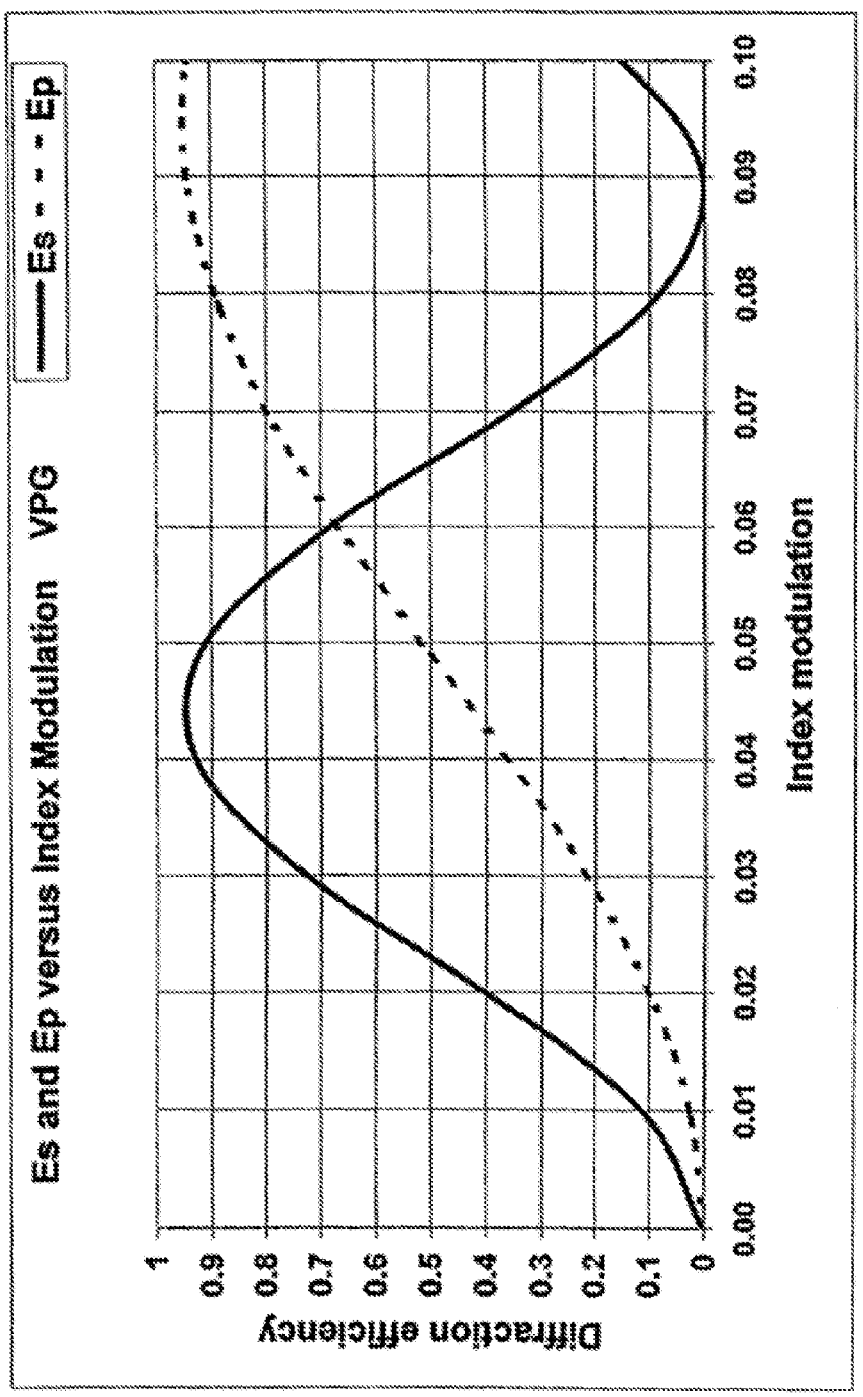
FIG. 7 is a typical plot of the S and P diffraction efficiencies of a Volume Phase Grating as functions of the index modulation, $\Delta n$, for a given effective medium thickness, T, and a given pair of angles of incidence and diffraction, $\Theta_i$, and $\Theta_d$.

FIG. 7 is a typical plot of the S and P diffraction efficiencies of a VPG as functions of the index modulation, $\Delta n$, for a given effective thickness, T, and a given pair of angles of incidence and diffraction. Note that the P efficiency lags the S efficiency as a function of the index modulation. This is a result of the cosine factor that exists for the P polarized diffraction efficiency in the Kogelnik theory as shown in the following discussion.

In the Kogelnik theory, a parameter ν is introduced, where ν is defined by the following equation:

$$\nu = \pi \Delta n T / [\lambda \sqrt{(C_R C_S)}] \quad (1)$$

where:

λ is the nominal wavelength of the incident light beam in air,

T is the effective thickness of the VPG medium,

Δn is the peak modulation of the VPG medium, $C_R$ is the incident beam obliquity factor (from the Kogelnik theory), $C_S$ is the diffracted beam obliquity factor (from the Kogelnik theory), and $C_R$ and $C_S$ are both functions of the average bulk refractive index, n, of the VPG medium.

The S-polarization diffraction efficiency is then given by the following equation:

$$E_S = \sin^2 \nu \quad (2)$$

and the P-polarization diffraction efficiency is given by the following equation:

$$E_P = \sin^2(\nu \cos 2\theta). \quad (3)$$

Figure 8:
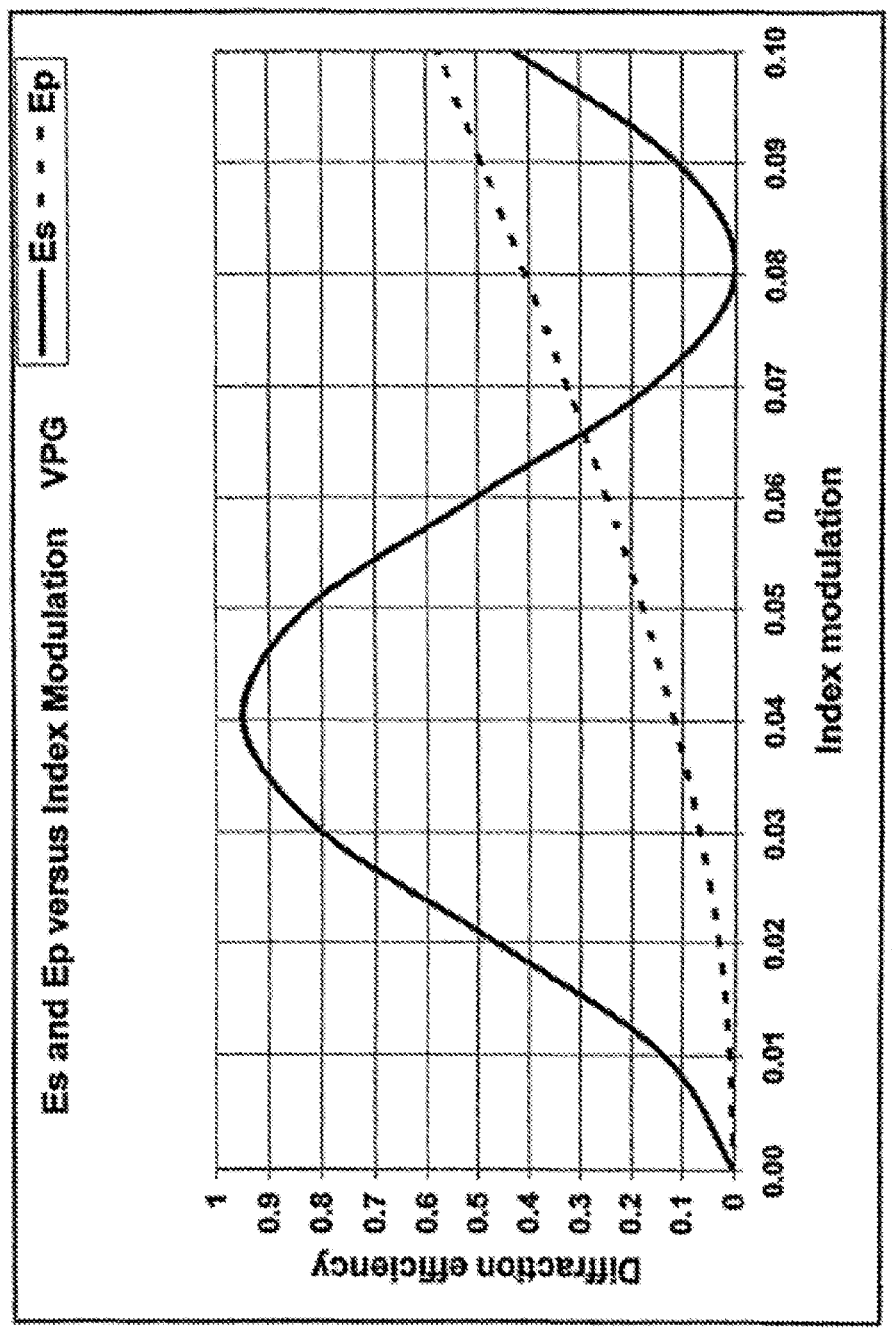
FIG. 8 is a plot of the S and P diffraction efficiencies of a Volume Phase Grating as functions of the index modulation, $\Delta n$, for a given effective medium thickness, T, and a given pair of angles of incidence and diffraction, $\Theta_i$, and $\Theta_d$, where these angles are greater than those in FIG. 7.

So the S-polarization diffraction efficiency is a function only of ν, whereas the P-polarization diffraction efficiency is a function of both ν and 2θ, which is the angle between the incident beam 34 and the diffracted beam 36 within volume phase medium 32. The dependence on u of the P-polarization diffraction efficiency produces the lag of $E_p$ relative to $E_s$ in the graph of diffraction efficiencies versus index modulation. The angle θ is determined by the angle of incidence, $\theta_i$, and the angle of diffraction, $\theta_d$. As these angles increase, the lag will increase. FIG. 8 shows the S and P diffraction efficiency curves for angles of incidence and diffraction that are larger than those in the example of FIG. 7. Eventually, when the angle of incidence, $\theta_i$, and the angle of diffraction, $\theta_d$, are such that the angle between the two beams inside the medium, 2θ, is 90 degrees, the amount of lag will be infinite and the P diffraction efficiency will never rise above zero, no matter how large the value of Δn. In that case, the diffracted beam will be completely S-polarized.

Since the P efficiency lags the S efficiency, the two diffraction efficiencies are not, in general, maximum at the same value of Δn. In a VPG that is intended for use in a WDM application, this will result in three possible scenarios, none of which are desirable.

Figure 9:
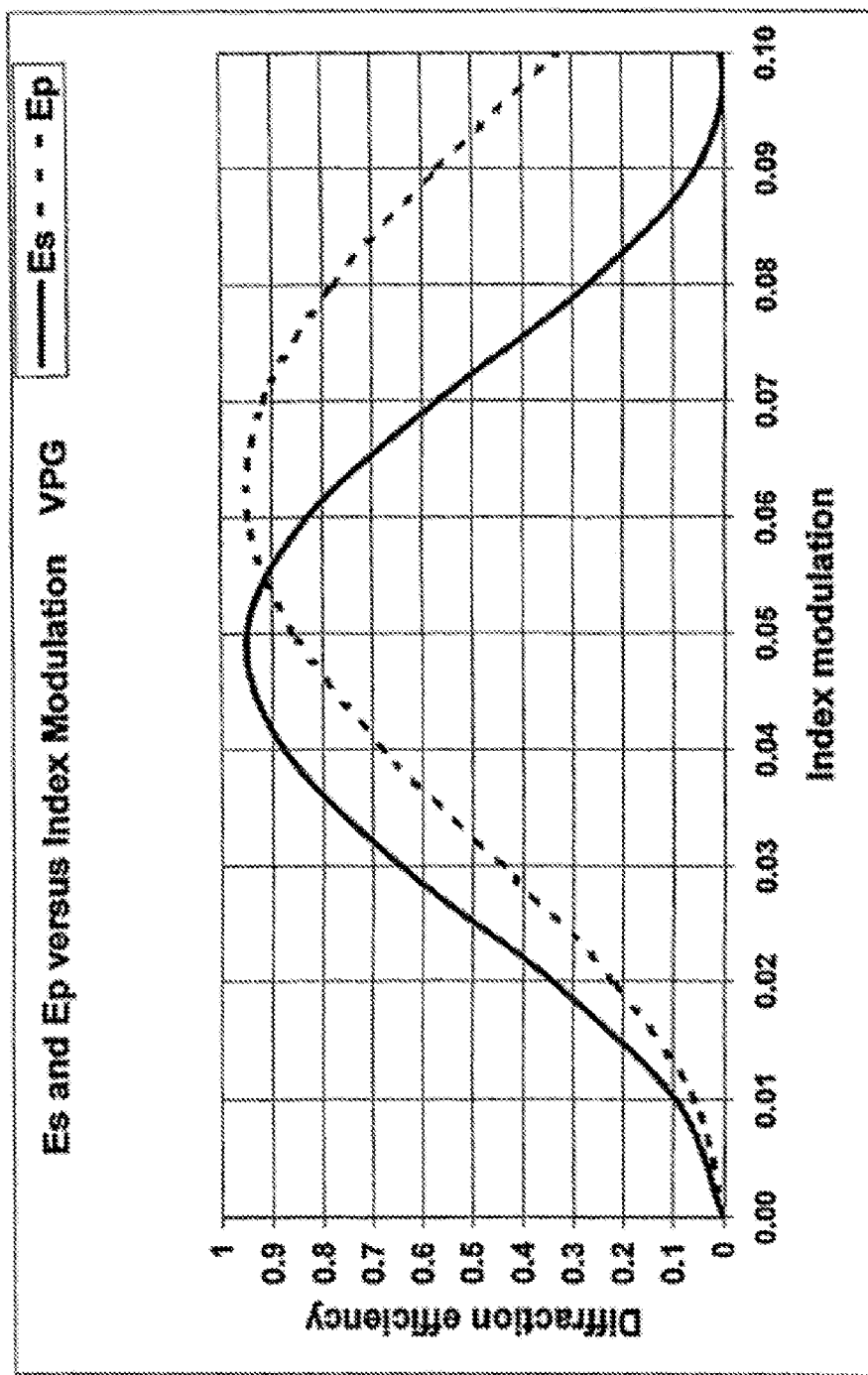
FIG. 9 is a plot of the S and P diffraction efficiencies of a Volume Phase Grating as functions of the index modulation, $\Delta n$, for a given effective medium thickness, T, and a given pair of angles of incidence and diffraction, $\Theta_i$, and $\theta_d$, where these angles are less than those in FIG. 7.

First, one could reduce the P—S lag by using relatively small angles of incidence and diffraction as has been done in the prior art. The S and P diffraction efficiency curves for this case are shown in FIG. 9. Note that the S and P diffraction efficiency curves intersect at a relatively high value of diffraction efficiency. Therefore, the S and P diffraction efficiencies will be equal and both diffraction efficiencies will be relatively high. The result will be reasonably low insertion loss and relatively low PDL across a fairly broad wavelength range. (Insertion loss is inversely related to the diffraction efficiency. PDL is directly related to the difference between the S and P diffraction efficiencies). The disadvantage of this approach is that the dispersion will be relatively low because the angles are relatively small. (The dispersion of a diffraction grating is directly related to the angle between the incident and diffracted beams.)

In a second case, the angles are increased in order to get more dispersion. Then we have the S and P diffraction efficiency curves similar to those shown in FIG. 7. One can then choose to operate at the peak of the S diffraction efficiency curve so that the insertion loss for S-polarization will be low. However, since the P diffraction efficiency is low at this value of Δn, the PDL will be very high.

In a third case, the angles are increased to provide very high dispersion so that we have the situation shown in FIG. 8. However, in this case, the choice is made to operate at the crossover point of the two curves in order to minimize the PDL. But both the S and P diffraction efficiencies will be low at this value of Δn. The net result is that this approach will provide very high dispersion and low PDL but very high insertion loss.

So the three cases just described provide (1) low insertion loss and low PDL but low dispersion; (2) low insertion loss and high dispersion but large PDL; or (3) high dispersion and low PDL but very high insertion loss. None of these three situations is optimal for WDM applications. What is desired is (a) high dispersion, (b) low insertion loss, and (c) low PDL.

Figure 10:
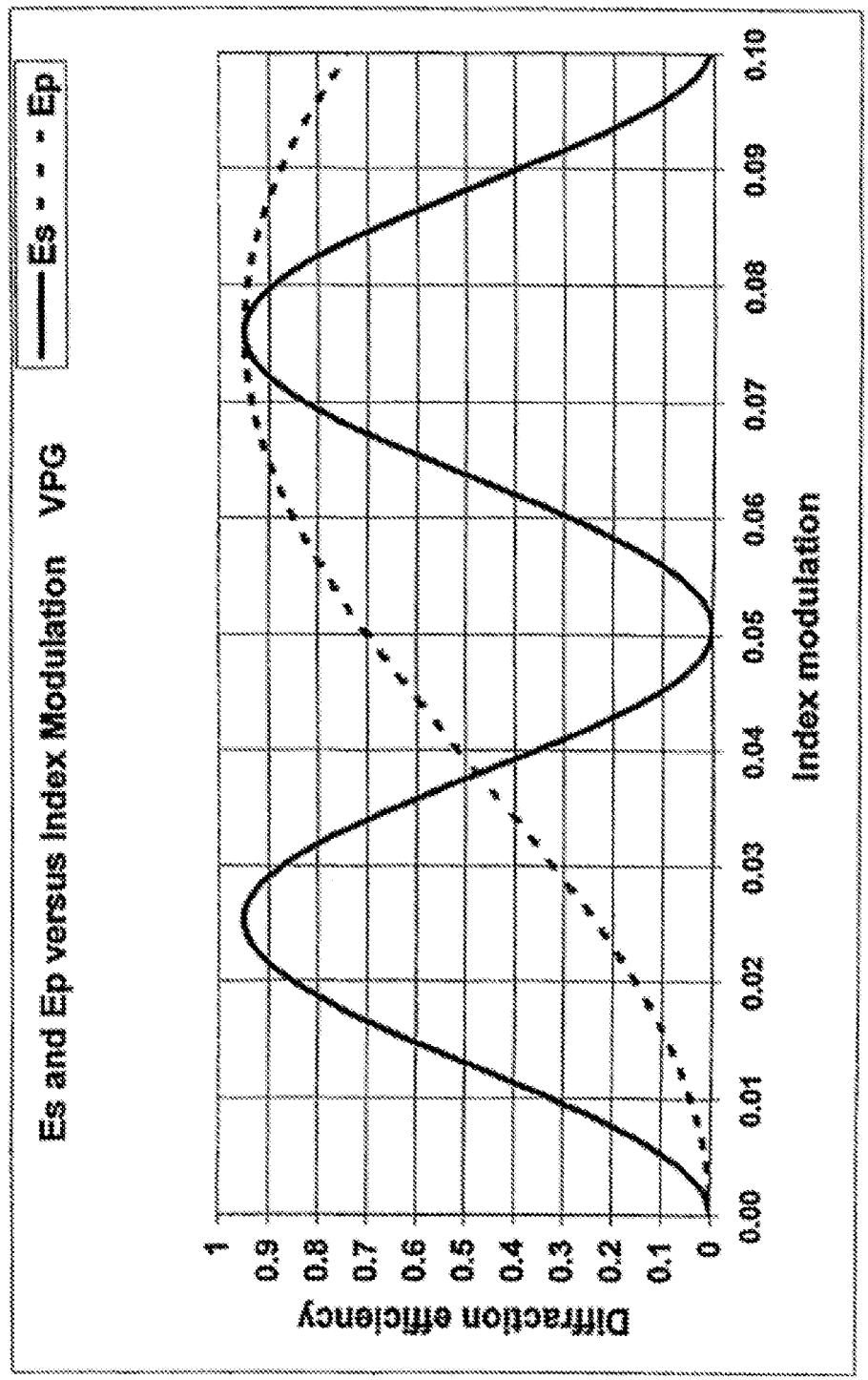
FIG. 10 is a plot of the S and P diffraction efficiencies of a Volume Phase Grating as functions of the index modulation, $\Delta n$, for a Volume Phase Grating in which the angles of incidence and diffraction, $\Theta_i$, and $\Theta_d$, are selected so that the second peak of the S diffraction efficiency curve coincides with the first peak of the P diffraction efficiency curve.

One can achieve this desired combination if the angles of incidence and diffraction are selected so that the P diffraction efficiency curve reaches its first maximum when the S diffraction efficiency curve reaches its second maximum. This situation is shown in FIG. 10. In this case, the S and P diffraction efficiencies are both equal and both maximum so that the PDL is minimized. In addition, the angles at which this equalization occurs are relatively large so that the dispersion is also large. The net result is that the insertion loss is low, the PDL is low and the dispersion is high. That is, we have the desired combination of all three major grating parameters.

Figure 11:
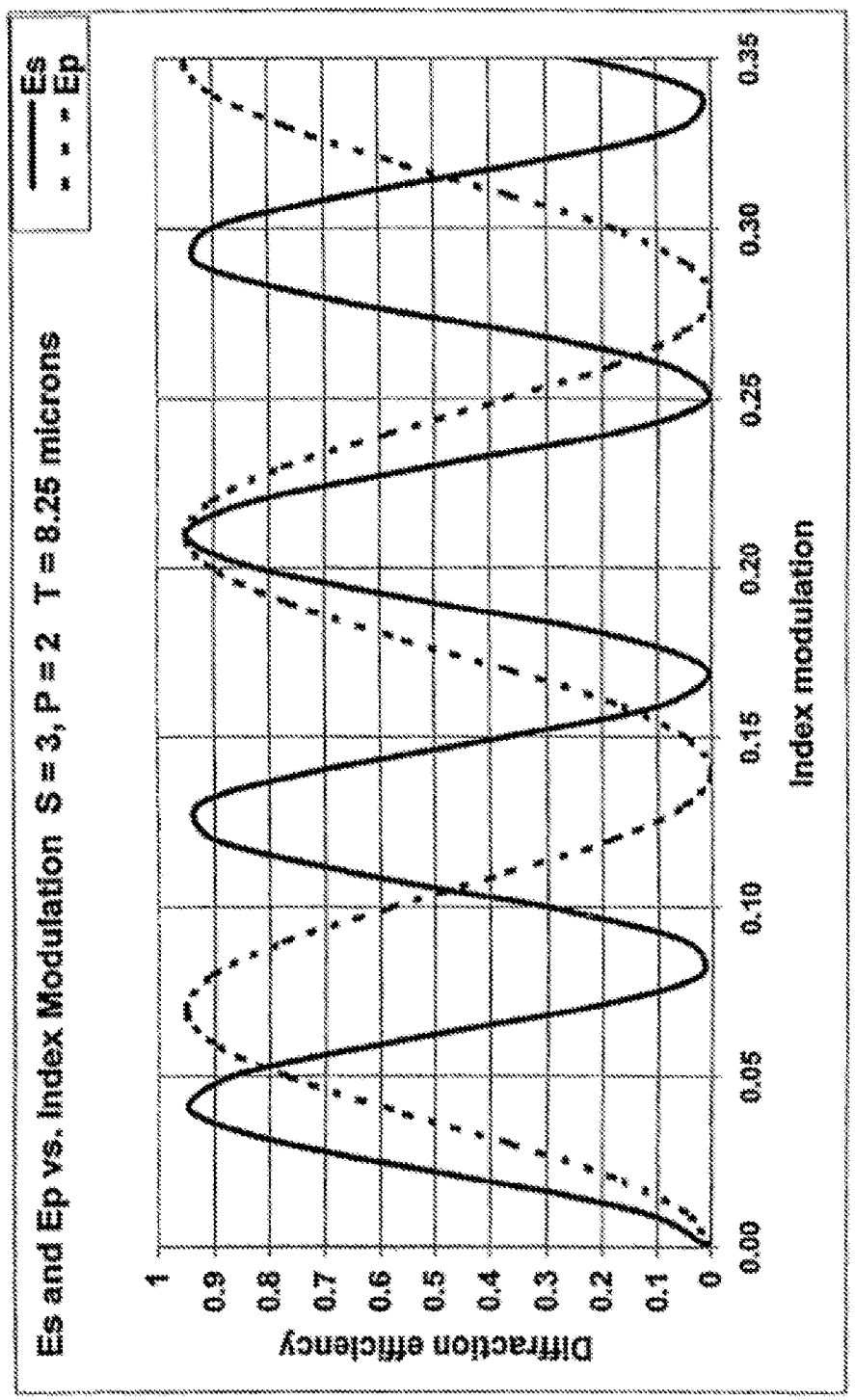
FIG. 11 is a plot of the S and P diffraction efficiencies of a Volume Phase Grating as functions of the index modulation, $\Delta n$, for a Volume Phase Grating in which the angles of incidence and diffraction, $\Theta_i$, and $\Theta_d$, are selected so that the third peak of the S diffraction efficiency curve coincides with the second peak of the P diffraction efficiency curve.

One can increase the dispersion even further by increasing the angles of incidence and diffraction until S and P maxima farther out along the Δn axis coincide. For example, one can select angles of incidence and diffraction so that the third peak of the S diffraction efficiency curve coincides with the first or second peak of the P diffraction efficiency curve, as shown in FIG. 11. This will provide greater dispersion and it will also allow the effective thickness, T, to be reduced (for a given index modulation, Δn). Higher order combinations are also possible but these combinations may be more difficult to fabricate.

In order for the S and P maxima to coincide, the values of Es and Ep from equations (2) and (3) must be simultaneously equal to 1. Es will be equal to 1 when $$\nu = \frac{2s - 1}{2}\pi$$

and Ep will be equal to 1 when $$\nu \cos(2\theta) = \frac{2p - 1}{2}\pi,$$

where s and p are integers, 1, 2, 3, . . . . The value of cos(2θ) at which the Es and Ep maxima coincide can be found by simply solving the above two equations for cos(2θ). The result is equation (4) below:

$$\cos(2\theta) = (2p-1)/(2s-1) \quad (4)$$

(Since the cosine of an angle cannot be greater than 1 for any real angle, the integer, p, must always be less than the integer, s, in equation (4).)

where:

s is the order of the S diffraction efficiency peak (1, 2, 3, . . . ) and p is the order of the P diffraction efficiency peak (1, 2, 3, . . . ), θ is the angle between the incident beam and the Bragg planes inside the medium (A Bragg plane is a plane of maximum refractive index in the medium), and 2θ is the angle between the incident beam and the diffracted beam inside the medium.

Equation (1) can be re-arranged to provide an equation for the index modulation:

$$\Delta n = \frac{\upsilon \lambda}{\pi T}\sqrt{C_R C_S}.$$

But from the derivation of Equation (4) above we know that $$\upsilon = \frac{2s-1}{2}\pi$$

when Es is maximum. Therefore, when Es is maximum, $$\Delta n = \frac{\lambda}{T}\left(\frac{2s-1}{2}\right)\sqrt{C_R C_S}$$

where $$C_R = \cos\alpha$$

$$C_S = \cos\alpha - \frac{\lambda}{nd}\tan\left(\frac{\beta-\alpha}{2}\right)$$

(See Kogelnik, H. "Coupled Wave Theory for Thick Hologram Gratings," Bell System Technical Journal, Vol. 48, No. 9, 1969, Equation 23).

The final result is:

$$\Delta n = \frac{\lambda}{T}\frac{2s-1}{2}\sqrt{C_R C_S} = \frac{\lambda}{T}\left(\frac{2s-1}{2}\right)\sqrt{(\cos\alpha)\left(\cos\alpha - \frac{\lambda}{nd}\tan\left(\frac{\beta-\alpha}{2}\right)\right)} \quad (5)$$

where all terms have been previously defined.

So the value of the index modulation, Δn, at which the S-polarization diffraction efficiency is maximum, for a given wavelength, index of refraction of the medium and effective thickness of the medium, is given by equation (5). Therefore, when equations (4) and (5) are satisfied simultaneously, the S and P diffraction efficiencies will be maximized simultaneously.

From FIG. 6 it can be seen that α+β=2θ, so that Equation (4) can be solved for β, the internal angle of diffraction, to yield:

$$\beta = a\cos\left(\frac{2p-1}{2s-1}\right) - \alpha. \quad (6)$$

Therefore, for given values of the bulk refractive index, n, effective thickness, T and wavelength, λ, and arbitrarily selected values of the integers s and p and the internal angle of incidence, α, the value of the internal angle of diffraction, β, established by Eq. (6) and the value of the index modulation, Δn, established by Eq. 5 will result in simultaneously maximizing the S-polarization diffraction efficiency, Es, and the P-polarization diffraction efficiency, Ep, at a common value of the index modulation, Δn.

This coincidence of the $s^{th}$ peak of the S-polarization diffraction efficiency curve and the $p^{th}$ peak of the P-polarization diffraction efficiency curve at a common value of the index modulation, Δn, is the major novel property of the Enhanced Volume Phase Grating. FIG. 11 is an example of a Dickson grating where the third peak of the S-polarization diffraction efficiency curve coincides with the second peak of the P-polarization diffraction efficiency curve at an index modulation value of 0.21.

Note that coincidence of the $s^{th}$ peak of the S diffraction efficiency curve and the $p^{th}$ peak of the P diffraction efficiency curve will also occur when the following equation for β is satisfied:

$$\beta = 180 - a\cos\left(\frac{2p-1}{2s-1}\right) - \alpha. \quad (7)$$

That is, the S and P diffraction efficiency peaks will coincide when the angle between the incident beam and the Bragg planes inside the medium is either θ or 90-θ. In other words, the two angles will lie equally to either side of the zero-P-efficiency angle of 45 degrees. The second angle will generally exceed the internal angle of total internal reflection (TIR) if the substrate is parallel to the VPG medium and the external medium is air. This problem can be overcome by using a dual-prism grism design such as that shown in FIGS. 15 and 26. This type of design allows the angles of incidence and diffraction inside the medium to exceed the normal TIR angle.

The required value of the index modulation, Δn, will be dependent on the effective thickness, T, the wavelength, λ, and the two obliquity factors, $C_R$ and $C_S$. The values of the obliquity factors will be dependent on the bulk index of the medium and the external angles of incidence and diffraction, as established by the Kogelnik theory.

As an example of the design process for a Dickson grating, consider the simplest case, where s=2 and p=1. Not only is this the simplest Dickson grating design, it is also the easiest Dickson grating to fabricate.

Note that the selection of the integer values of s and p in design of a Dickson grating is completely arbitrary, so long as s>p. The design process would be identical for any combination of s and p integers. Dickson gratings resulting from a selection of larger values of s and p would have greater dispersion but would be more difficult to fabricate and would typically require the use of external prisms.

Each Dickson grating included in the inventive multi-HOE grating may be implemented to have uniformly high diffraction efficiency across a broad wavelength range (including a nominal wavelength) for all polarizations and is implemented (and oriented during use) with the bulk index and index modulation (and optionally also the thickness or effective thickness) of its volume phase material, and angles of incidence and diffraction of the radiation to be diffracted thereby, such that its diffraction efficiency for both S-polarization and P-polarization are simultaneously maximized at the nominal wavelength. The volume phase material of each such Dickson grating is created, coated, exposed and processed so as to obtain the desired values of these major parameters.

When the angles of incidence and diffraction within the substrate media are such that they exceed the TIR angle, then the multi-HOE grating must include an entrance and exit prism.

Once s and p are selected (s=2 and p=1 in the example), the angle of incidence, $\theta_i$, must be selected. The angle of incidence, $\theta_i$, can be selected to provide a symmetric grating design, where the angle of diffraction, $\theta_d$, is equal to the angle of incidence, $\theta_i$, or a non-symmetric grating design, where the angle of diffraction, $\theta_d$, is not equal to the angle of incidence, $\theta_i$. The choice is generally governed by other factors in the overall system design.

Once $\theta_i$ is established, the internal angle of incidence, $\alpha$, can be determined using the well known Snell's Law and the known bulk refractive index, n, of the volume phase medium. Then, once this internal angle of incidence, $\alpha$, is determined, equation (6) can be used to establish the internal angle of diffraction, $\beta$. Then Snell's Law can be used to determine the external angle of diffraction, $\theta_d$.

Knowing the internal angle of incidence, $\alpha$, the internal angle of diffraction, $\beta$, the bulk refractive index, n, of the volume phase medium and the free space wavelength, $\lambda$, of the incident beam, one can use the following equation, which is a transposition of the grating equation noted earlier, to determine the grating period, d:

$$d = \frac{\lambda}{n(\sin\alpha + \sin\beta)}. \quad (8)$$

Furthermore, knowing the external angle of incidence, $\theta_i$, and the external angle of diffraction, $\theta_d$, the construction illumination geometry of a Dickson grating can be established. In fact, if the application wavelength and the construction wavelength for a Dickson grating are the same, then $\theta_i$ and $180+\theta_d$ will be the construction angles for the laser beams used in constructing the Dickson grating. If the construction wavelength is not the same as the application wavelength, as is often the case, then the construction angles must be modified in accordance with procedures that are well known in the art of fabrication of volume phase gratings (for example, following the teachings of U.S. Pat. Nos. 6,085,980 and 6,112,990).

The final step in the fabrication process of a Dickson grating is to expose and process the grating so that the peak index modulation, $\Delta n$, is equal to the value calculated in equation (5). Exposure and processing methods to accomplish this are well known in the art (See, for example, Chang, M. "Dichromated Gelatin of Improved Quality", Applied Optics, Vol. 10, p. 2250, 1971 and Meyerhofer, D. "Phase Holograms in Dichromated Gelatin," RCA Review, Vol. 35, p. 110, 1972.)

Note: In an alternative design process, one can select a value for the external angle of diffraction, $\theta_d$, and use Snell's Law to determine the internal angle of diffraction, $\beta$, equation (6) to determine the internal angle of incidence angle, $\alpha$ and Snell's Law to determine the external angle of incidence, $\theta_i$. The construction process and the procedure to establish the peak index modulation, $\Delta n$, would be the same as for the case where the angle of incidence, $\theta_i$, was selected at the outset.

Satisfying equations (5) and (6) is sufficient to obtain high diffraction efficiency for both polarizations simultaneously. And the angles needed to satisfy the second of these two equations will result in high dispersion. However, there is a fourth requirement for a WDM grating. The fourth requirement is that the WDM application requires low insertion loss and low PDL across the full width of the relevant telecommunications passband. E.g., for the C band, the insertion loss and the PDL must be acceptably low over the full wavelength range from 1528 nm to 1565 nm. The fourth requirement is met by Dickson gratings, having $\Delta n$ on the order of 0.2 (i.e., $0.17 \leq \Delta n \leq 0.22$) or greater (e.g., $\Delta n=0.26$), and designed in accordance with referenced U.S. Pat. No. 6,750,995. However, the fourth requirement could not be met by conventional VPGs (that are not Dickson gratings having $\Delta n$ on the order of 0.2 or greater) because of the high Bragg angle sensitivity that would result when the necessary design criteria are met. Bragg angle sensitivity is the variation of diffraction efficiency as a function of either the wavelength or the angle of incidence of the incident beam.

Figure 12:
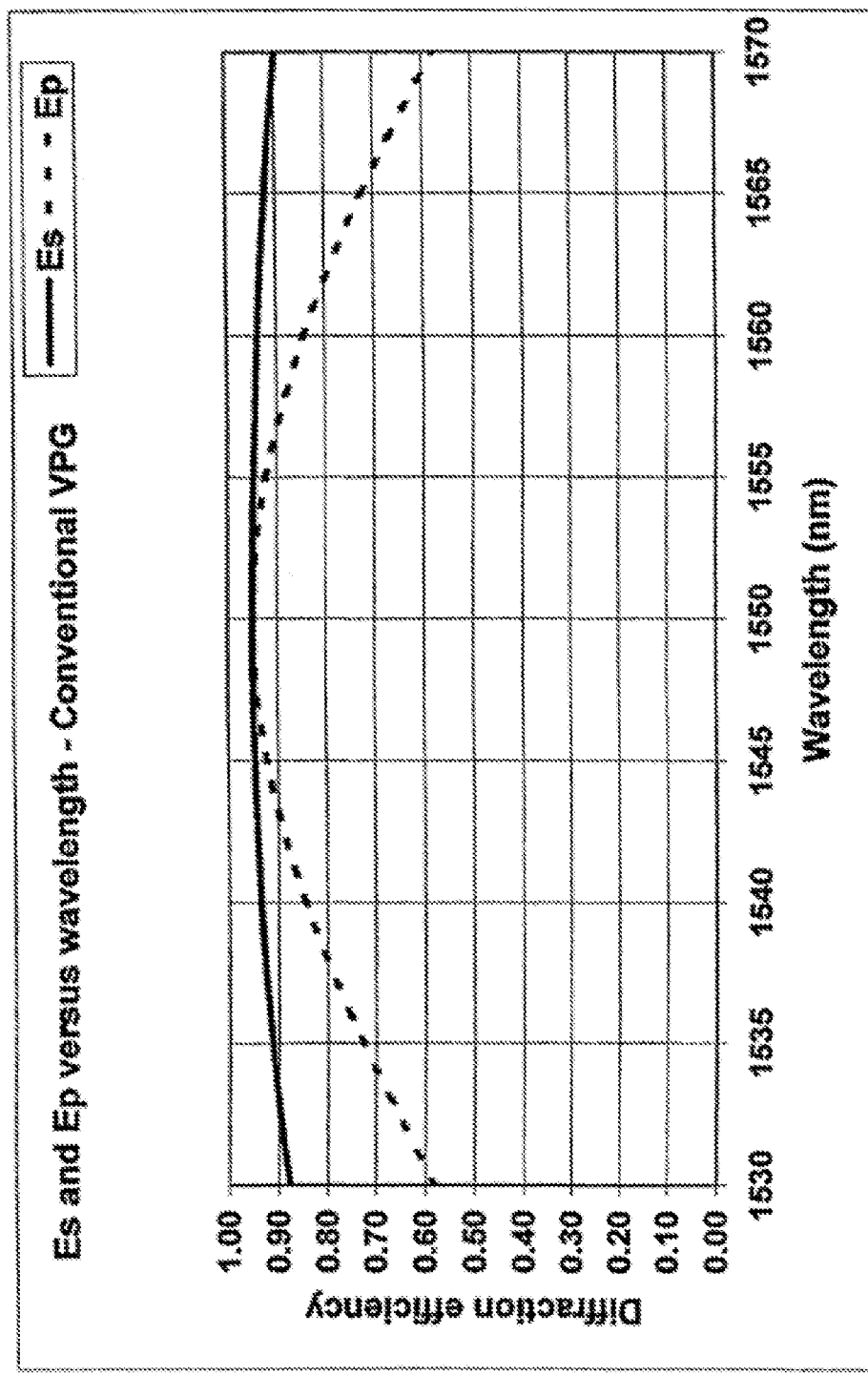
FIG. 12 is a plot of the S and P diffraction efficiencies as functions of wavelength for the Volume Phase Grating of FIG. 10.

In a conventional VPG, $\Delta n$ is typically in the range of 0.05 to 0.08. In order to satisfy equation (2) an effective thickness on the order of 25 to 35 microns would be required (for the volume phase medium of such a conventional VPG). It is well known that Bragg angle sensitivity is a strong function of the effective thickness of the medium. FIG. 12 shows the variation of S and P diffraction efficiencies for a conventional VPG having an effective medium thickness of 35 microns. The Bragg angle sensitivity is quite large and the resulting PDL at the ends of the passbands is totally unacceptable for WDM applications.

To implement a Dickson grating (whose volume phase medium is DCG) so as to solve the final problem (i.e., to achieve low insertion loss and low PDL across a wide range of wavelengths of incident radiation, for example, across the full width of a telecommunications passband, without excessive Bragg angle sensitivity), the volume phase medium of the Dickson grating is exposed and processed to achieve a $\Delta n$ on the order of 0.2 (i.e., $0.17 \leq \Delta n \leq 0.22$) or greater (e.g., $\Delta n=0.26$). Processing procedures for DCG are well known in the art and processing for high $\Delta n$, while difficult, is an extension of known DCG processing methods. To manufacture a typical implementation of a Dickson grating that solves the final problem, the volume phase medium (DCG) is spin coated on a glass or fused silica substrate to a physical thickness that is on the order of 15 microns. The volume phase medium is exposed in a conventional dual-beam holographic grating fabrication process using a laser with a wavelength to which the DCG is responsive. It is then processed in a sequence of alcohol water baths using well-known DCG processing procedures. After drying and edge stripping to provide an adhesive o-ring seal when capped, the actual gratings are then diced from the larger grating, and then sealed (capped) with a cover glass. The exposure and processing of the DCG yields a final effective thickness (of the volume phase medium) of approximately 9 to 10 microns.

Figure 13:
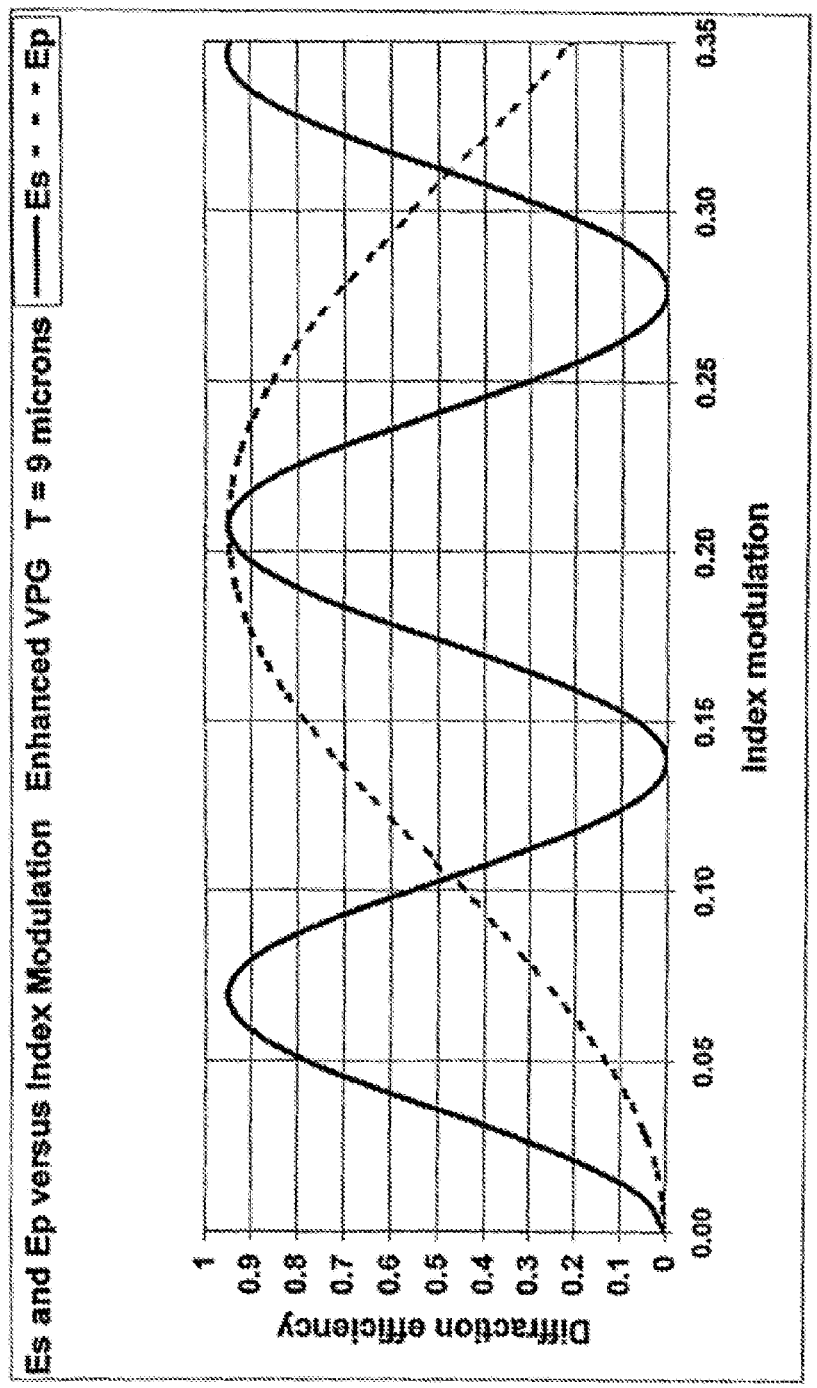
FIG. 13 is a plot of the S and P diffraction efficiencies as functions of the index modulation, $\Delta n$, for a Dickson grating.

FIG. 13 shows the S and P diffraction efficiency curves for one example of a Dickson grating whose volume phase medium is DCG (processed as explained in the preceding paragraph) having an effective thickness of 9 microns, and which is designed for use such that the angles of incidence and diffraction satisfy equation (4). The post-processing bulk refractive index of the volume phase medium is approximately 1.27, but may vary from 1.2 or less to 1.4 or greater.

Figure 14:
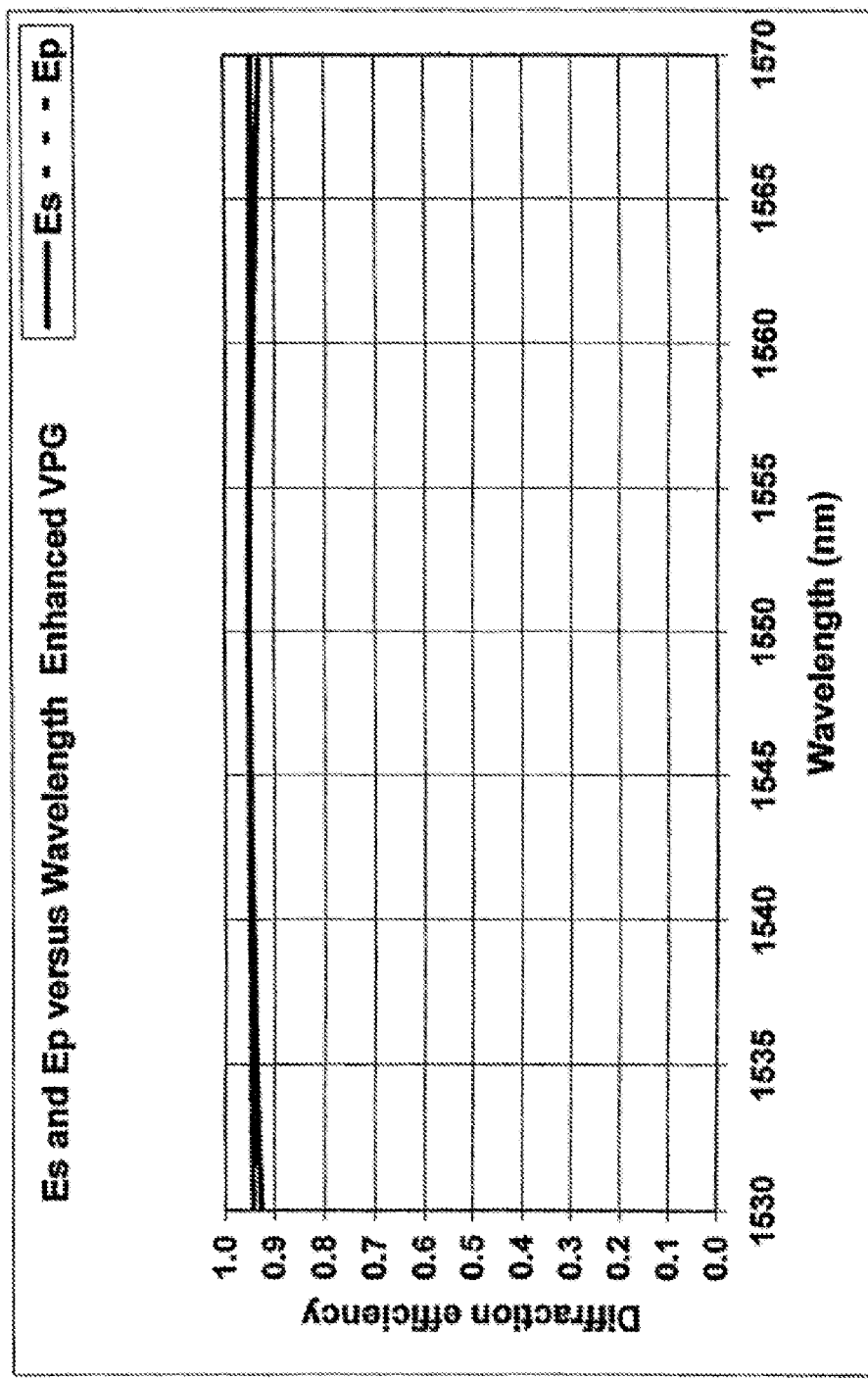
FIG. 14 is a plot of the S and P diffraction efficiencies as functions of wavelength for a Dickson grating.

FIG. 14 shows the variation of the S and P diffraction efficiencies as functions of wavelength for the Dickson grating of FIG. 13. Note that both efficiencies fall off only slightly to either side of the nominal wavelength and the difference in falloff of the two polarizations is very small so that PDL will be low across the full bandwidth.

The design of the Dickson grating of FIGS. 13 and 14 satisfies all of the major requirements for an effective diffraction grating for WDM applications—high dispersion, low insertion loss, low PDL—all across the full passband.

Some implementations of Dickson gratings have higher numbers for p and s in Equations 4 and 5, and thus have higher dispersion than the grating described above. Typically, higher p and s numbers will require the use of a grism design (where "grism" denotes an optical element that includes a diffraction grating and at least one prism).

Figure 15:
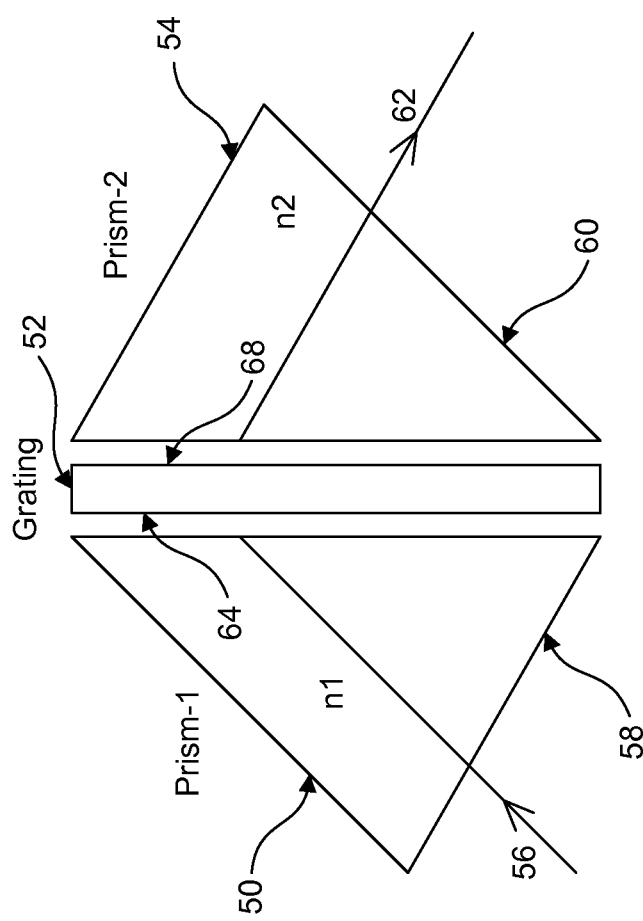
FIG. 15 is an embodiment of a Dickson grating in which a prism is used at the entrance and/or exit surface of the grating.

A Dickson grating having a grism design is shown in FIG. 15. A first prism 50 is attached to entrance surface 64 of the grating's volume phase medium 52 and a second prism 54 is attached to exit surface 68 of volume phase medium 52. The incident beam 56 may be normal to the entrance surface 58 of the prism 50 or it may be at some non-normal angle, depending on the design requirements of the grating and the system in which it is to be used. Similarly, the exit beam 62 may be normal to the exit surface 60 of the second prism or it may be at some non-normal angle, depending on the design requirements of the grating and the system in which it is to be used. The two prisms are not necessarily equal in geometric shape or refractive index. In the extreme, the refractive index of one of the prisms could be 1, so that the two-prism embodiment becomes a single-prism embodiment.

A prism is typically required for higher order grating designs (larger values of s and p) but it may also be advantageous in the primary order design for packaging reasons or mechanical stability.

Figure 16:
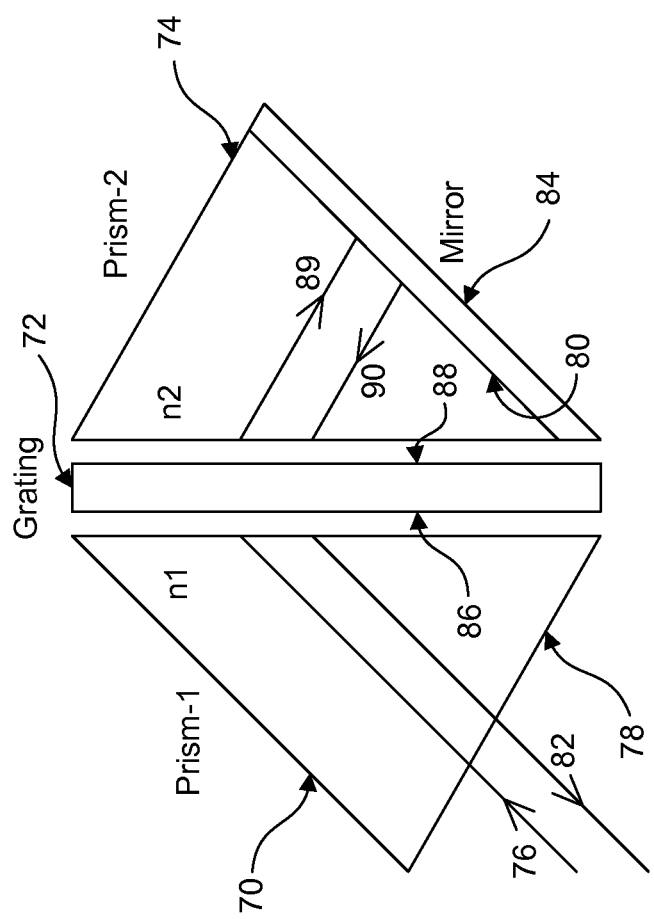
FIG. 16 is an embodiment of a Dickson grating in which a reflective means is provided at the final surface of the exit prism.

A further embodiment of a Dickson grating is shown in FIG. 16. This embodiment is similar to that shown in FIG. 15 but with the addition of a minor 84 attached to the final surface 80 of the exit prism 74. The mirror 84 reflects the diffracted beam 89 back into the grating 72 for a second pass 90, thereby increasing the overall dispersion. The double-pass design concept for conventional (non-enhanced) volume phase gratings has been described in the prior art.

In a variation on the FIG. 16 embodiment, exit prism 74 is omitted (so that the device includes only Dickson grating 72, prism 70, and minor 84 in contact with Dickson grating 72). In an implementation of such a variation, the spatial frequency of the Dickson grating is 780.5 lines per mm.

Figure 17:
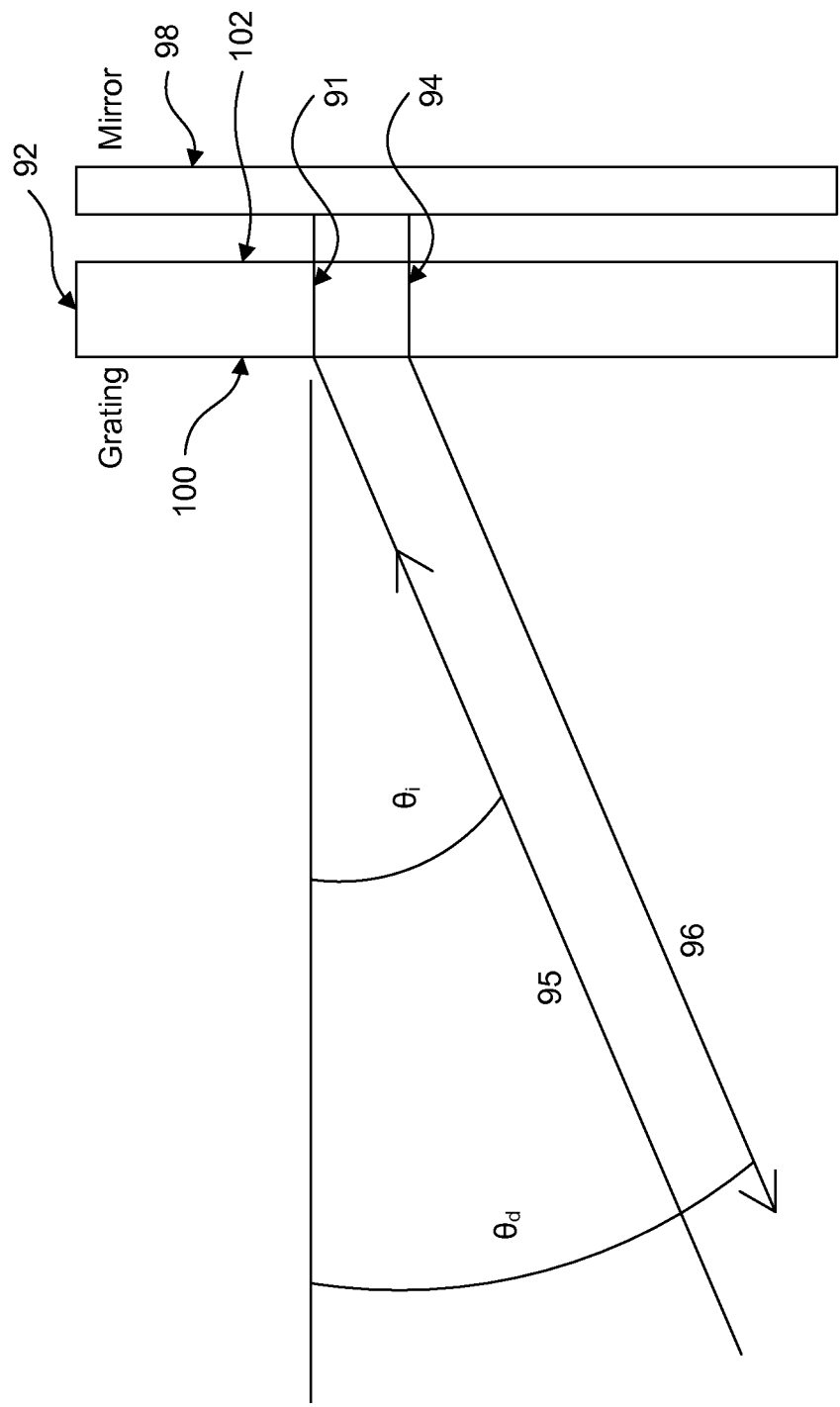
FIG. 17 is an embodiment of a Dickson grating in which a reflective means is provided at the exit surface of the grating.

A further embodiment of a Dickson grating is shown in FIG. 17. This embodiment includes a minor 98 attached to, or located in the vicinity of, the final surface 102 of the grating 92. The minor 98 reflects the diffracted beam 91, back into the grating at, or near, normal incidence for a second pass 94, through the grating 92 thereby more than doubling the dispersion. Such a design functions like a Littrow grating, but with higher dispersion for a given grating spatial frequency.

Figure 18:
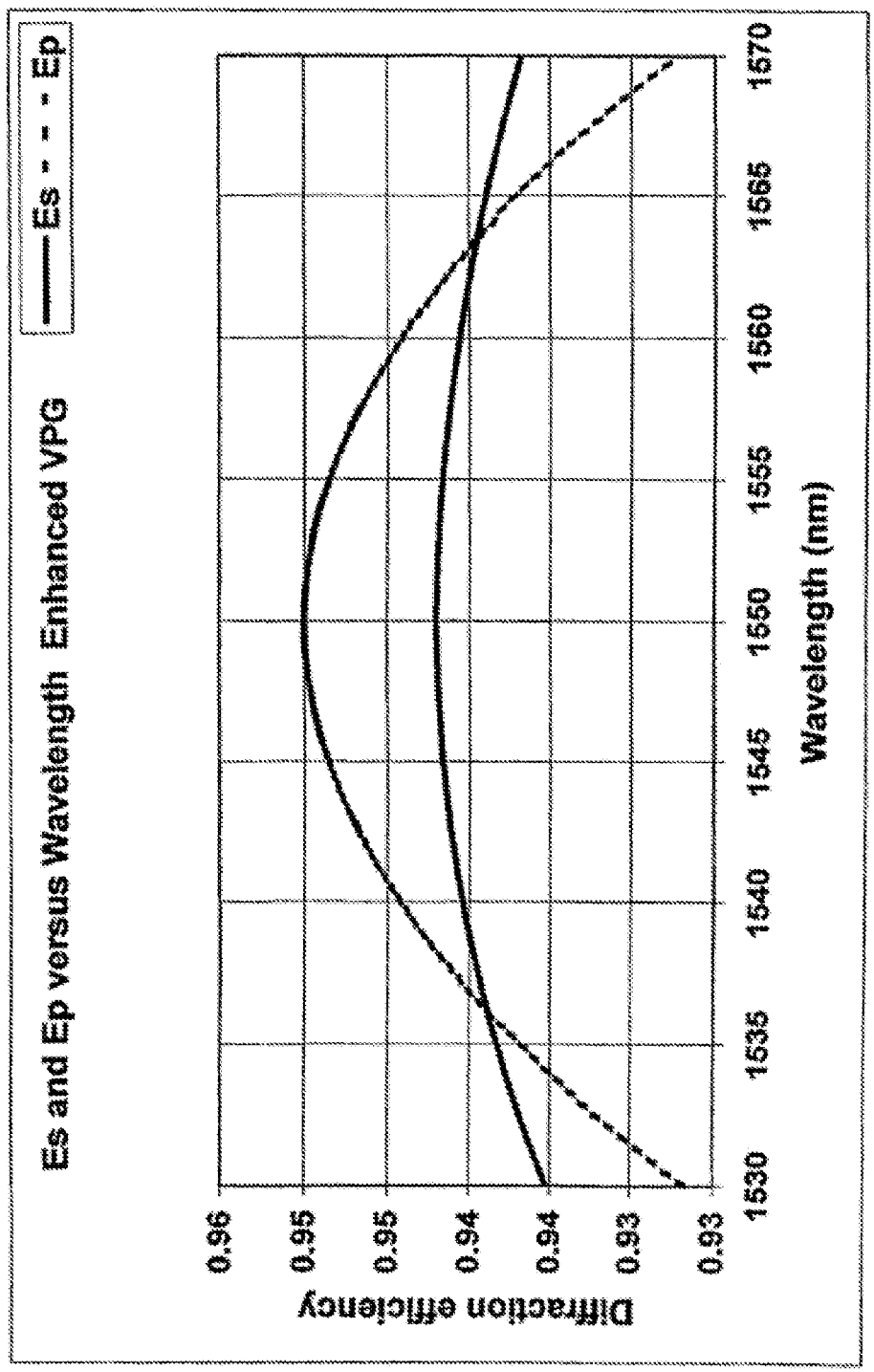
FIG. 18 is a plot of the S and P diffraction efficiencies as functions of wavelength for an embodiment of a Dickson grating in which the worst case PDL is reduced.

In an implementation of the Dickson grating of FIG. 6, substrate 42 and cover 26 are both coated with an anti-reflection (AR) coating so that at the nominal wavelength, λ, the overall loss for S-polarization is slightly greater than the overall loss for P-polarization. The resultant S and P wavelength Bragg sensitivity curves are shown in FIG. 18. Note that the PDL is now non-zero at the nominal wavelength but it is also less at the wavelengths corresponding to the ends of the passband. That is, the worst-case PDL has been reduced.

Figure 19:
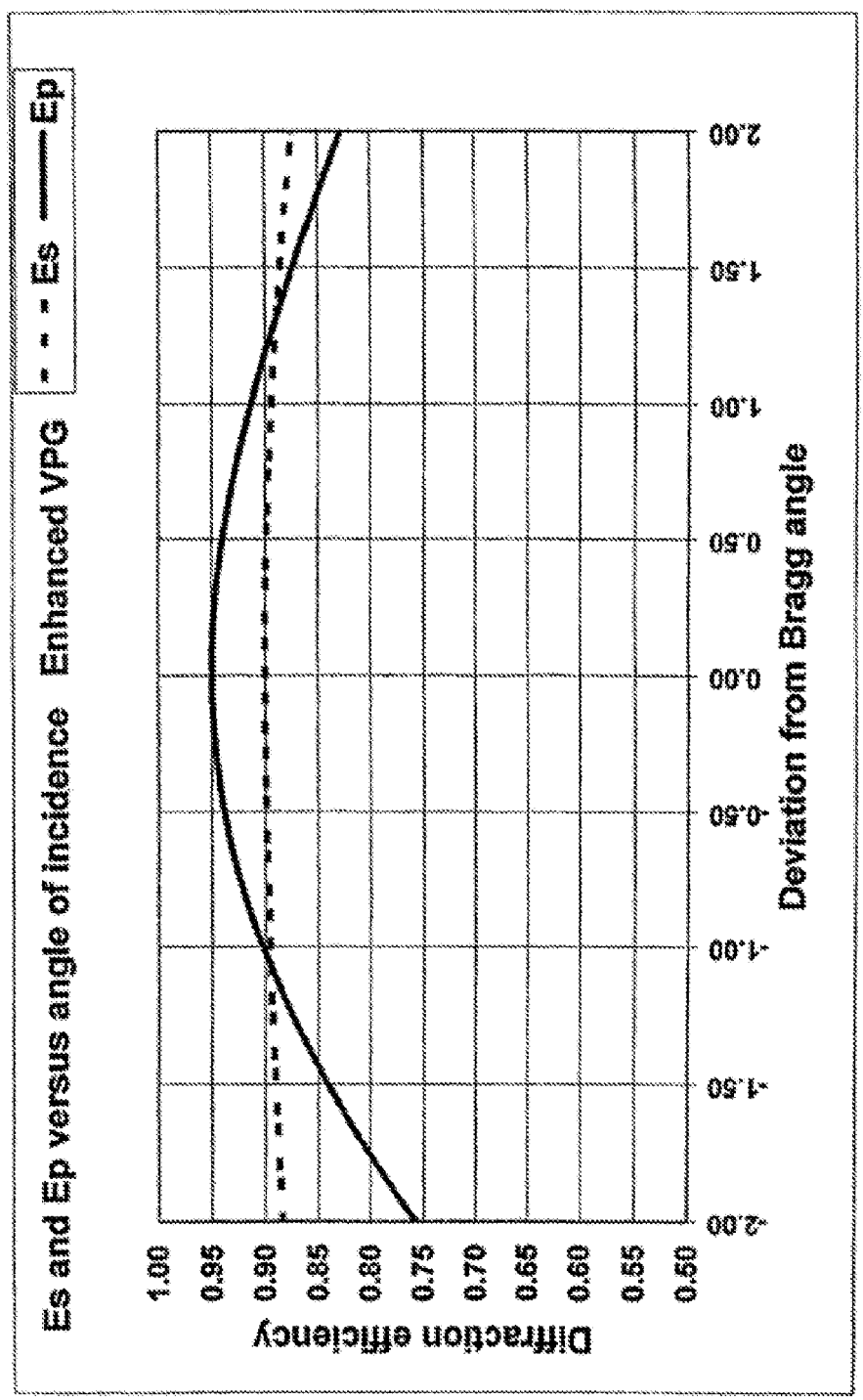
FIG. 19 is a plot of the S and P diffraction efficiencies as functions of the angle of incidence for an embodiment of a Dickson grating in which the Bragg sensitivity is reduced for a double-pass design.

In another variation on the FIG. 6 embodiment of a Dickson grating, substrate 42 and cover 26 are both coated with an AR coating so that at the nominal wavelength, λ, the overall loss for S-polarization is greater than the overall loss for P-polarization by an amount that is greater than that of the prior extension discussed above. This additional loss improves the performance of the Dickson grating in a two-pass design. This can be seen in FIG. 19. This graph shows the variation in the S and P diffraction efficiencies as a function of the angle of incidence of the beam. In a two-pass design, the angle of incidence at the second pass through the grating varies as a function of the wavelength due to the dispersion resulting from the first pass through the grating. At the extremes of the passband, the angle of incidence will be such as to lower the S and P diffraction efficiencies. Increasing the nominal loss for the S beam, as shown, will reduce the worst case PDL.

In an embodiment of an implementation of the Dickson grating of FIG. 6, the angle of incidence, α, in volume phase medium 32 equals the angle of diffraction, β, in volume phase medium 32 at the nominal wavelength, λ. These particular implementations have two significant advantages: (a) the dispersion will be maximized compared to other combinations of angles that satisfy equations (4) and (5); (b) the Bragg surfaces 46 will be normal to the surface 40 of the substrate 42, which simplifies the fabrication process. However, implementations in which the angles α and β are not equal may have geometric or other advantages.

Figure 20:
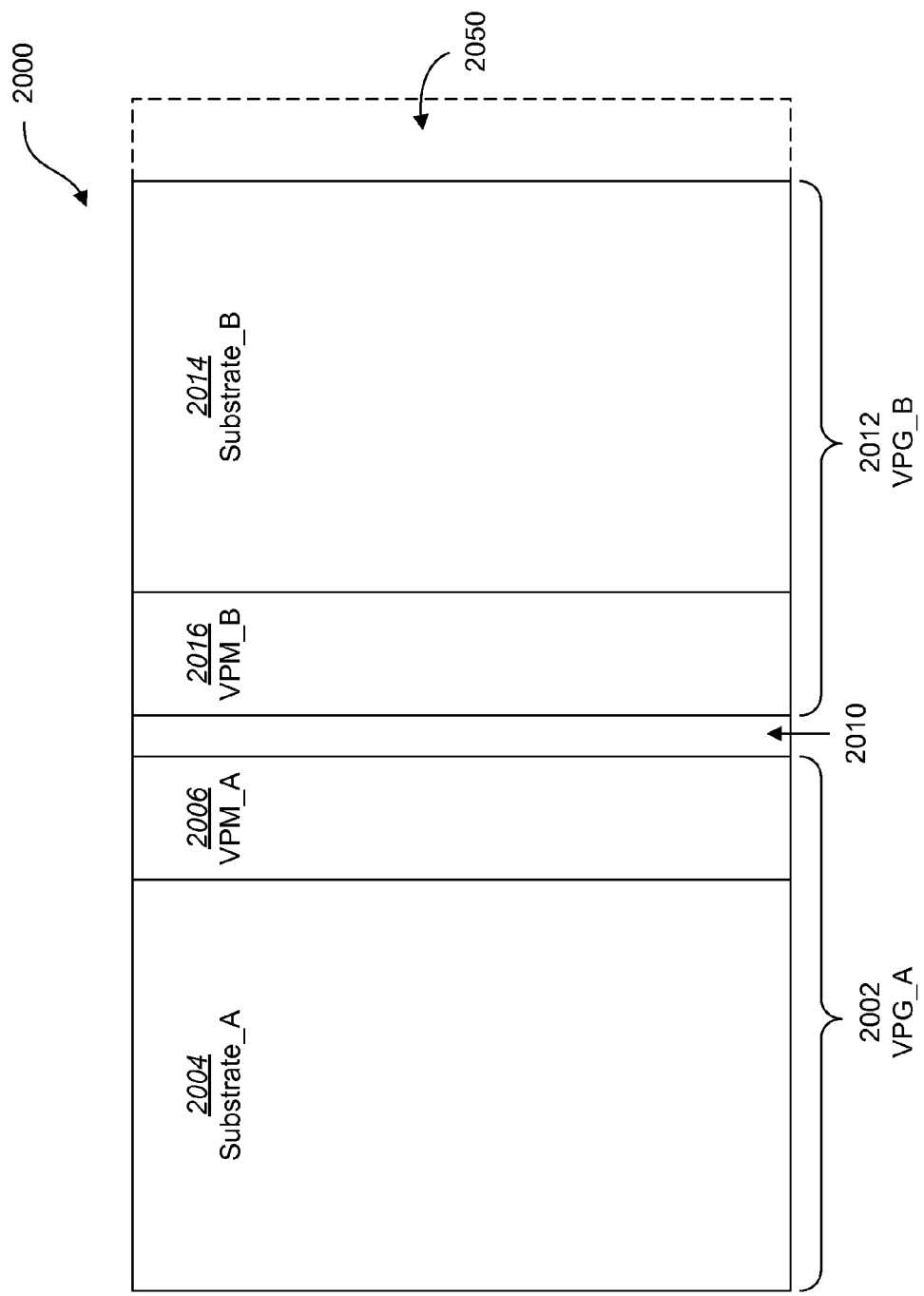
FIG. 20 is a cross-sectional view of an embodiment of a multi-HOE grating.

FIG. 20 is a cross-sectional view of an embodiment of a multi-HOE grating 2000 that includes VPG_A 2002 (comprising substrate_A 2004 and volume phase medium_A 2006), VPG_B 2012 (comprising substrate_B 2014 and volume phase medium_B 2016), and transparent, index matched glue (or other transparent, index matched adhesive) 2010 between medium_A 2006 and medium_B 2016. Each of media 2006, 2016 may be a hologram composed of dichromated gelatin ("DCG") having a periodically modulated refractive index. In the present embodiment, VPG_A 2002 and VPG_B 2012 are both non-symmetric non-Dickson gratings.

In some embodiments, VPG_A 2002 and VPG_B 2012 have substantially the same spatial frequency. In other embodiments, VPG_A 2002 and VPG_B 2012 have different spatial frequencies.

As with the embodiment of FIG. 2, the multi-HOE grating 2000 of FIG. 20 may provide more dispersion than can be provided by either VPG 2002, 2012 alone (or by a VPG that is thicker than but otherwise identical to one of the VPGs 2002, 2012) without the need for a prism. The multi-HOE grating 2000 of FIG. 20 can be manufactured with relaxed manufacturing parameters (relative to those for more complicated gratings, e.g., those including one or more prisms) due to its low Fresnel reflection losses for both S- and P-polarized radiation.

The multi-HOE grating 2000 of FIG. 20 can be oriented so that the radiation to be dispersed thereby is incident either at either substrate_A 2004 (in which case we refer to VPG_A 2002 as the "first" grating and VPG_B 2012 as the "last" grating) or substrate_B 2014 (in which case we refer to VPG_B 2012 as the "first" grating and VPG_A 2002 as the "last" grating). The Bragg planes of the media 2006, 2016 typically have relative orientation such that the exit beam angle of the first grating matches the entrance beam angle of the last grating. If it is desired that the exit beam aspect ratio is the same as that of the entrance beam, the exit beam angle of the last grating should match the entrance beam angle of the first grating.

Note that in some embodiments of the inventive multi-HOE grating (including typical implementations of the multi-HOE grating 2000 of FIG. 20), the Bragg planes of the first VPG and last VPG may have relative orientation such that the entrance beam angle of the first VPG matches the exit beam angle of the last VPG (to ensure that the multi-HOE grating does not change the beam aspect ratio), and also such that the exit beam angle of the first VPG matches the entrance beam angle of the last VPG.

In an exemplary embodiment of the multi-HOE grating 2000 of FIG. 20, VPG_A 2002 and VPG_B 2012 are both non-symmetric non-Dickson gratings with a spatial frequency of 900 lines per mm. In this embodiment, the FIG. 20 multi-HOE grating 2000 may provide at least as much dispersion as a volume phase grating (designed for diffracting the same radiation) having a spatial frequency of 1800 lines per mm.

More generally, in another embodiment of a multi-HOE grating 2000, VPG_A 2002 is a non-symmetric non-Dickson grating having spatial frequency of "A" lines per mm (in the sense that the refractive index modulations of the volume phase medium_A 2006 of VPG_A 2002 have a spatial frequency of "A" lines per mm) and VPG_B having a spatial frequency of "B" lines per mm, with VPG_B 2012 in contact with (typically, bonded "directly to") VPG_A 2002 in the sense that only a layer of transparent adhesive 2010 having uniform or substantially uniform thickness separates the two gratings 2002, 2012 from each other. The multi-HOE grating 2000 may provide at least as much dispersion as a single VPG (designed and configured for diffracting the same radiation) having a spatial frequency equal (or substantially equal) to (A+B) lines per mm.

In a further embodiment, the inventive multi-HOE grating 2000 shown in FIG. 20 can be implemented as a reflective grating if an optional minor 2050 (shown in phantom view in FIG. 20) is affixed to substrate_B 2014 as shown, to make the grating useful in a reflective, double pass mode in which radiation propagates through the VPGs 2002, 2012, then reflects from minor 2050, and then propagates back through the VPGs 2002, 2012. The grating elements 2006, 2016 may be designed to direct the diffracted light approximately normal to the mirror 2050.

Figure 21:
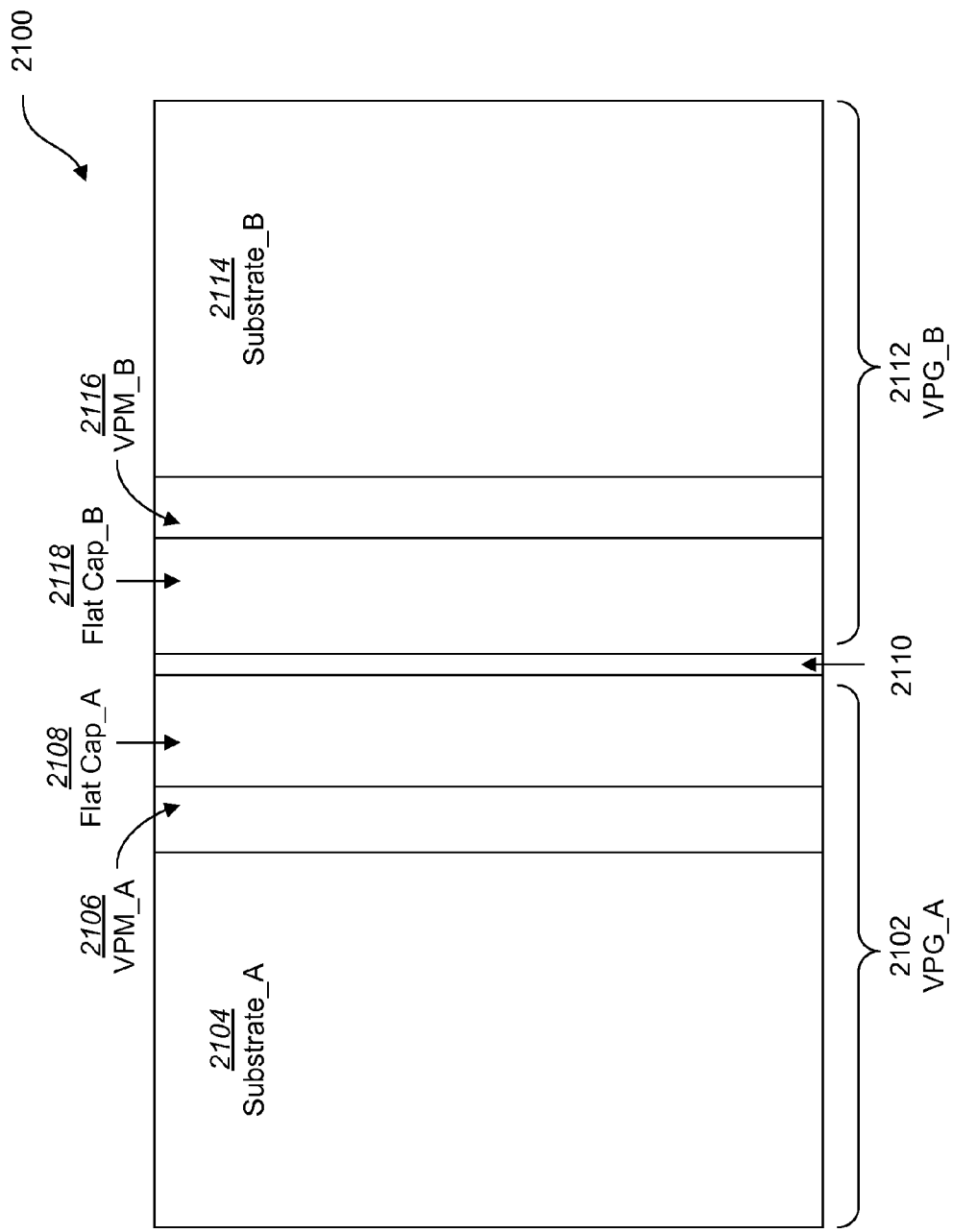
FIG. 21 is a cross-sectional view of another embodiment of a multi-HOE grating.

FIG. 21 is a cross-sectional view of another embodiment of a multi-HOE grating 2100 that includes VPG_A 2102 (comprising substrate_A 2104, volume phase medium_A 2106, and flat cap_A 2108), VPG_B 2112 (comprising substrate_B 2114, volume phase medium_B 2116, and flat cap_B 2118), and transparent, index matched glue (or other transparent, index matched adhesive) 2110 between the two caps 2108, 2118. Each of the media 2106, 2116 may be a hologram composed of dichromated gelatin ("DCG") having a periodically modulated refractive index. Both caps 2108, 2118 may be flat, transparent elements, which may consist of fused silica in typical implementations. In the present embodiment, VPG_A 2102 and VPG_B 2112 are both non-symmetric non-Dickson gratings.

In some embodiments, VPG_A 2102 and VPG_B 2112 have substantially the same spatial frequency. In other embodiments, VPG_A 2102 and VPG_B 2112 have different spatial frequencies.

The multi-HOE grating 2100 shown in FIG. 21 may be oriented so that the radiation to be dispersed thereby is incident at either substrate_A 2104 (in which case we refer to VPG_A 2102 as the "first" grating and VPG_B 2112 as the "last" grating) or substrate_B 2114 (in which case we refer to VPG_B 2112 as the "first" grating and VPG_A 2102 as the "last" grating). The Bragg planes of both media 2106, 2116 typically should have relative orientation such that the exit beam angle of the first grating matches the entrance beam angle of the last grating. If it is desired that the exit beam aspect ratio is the same as that of the entrance beam, the exit beam angle of the last grating should match the entrance beam angle of the first grating.

Figure 22:
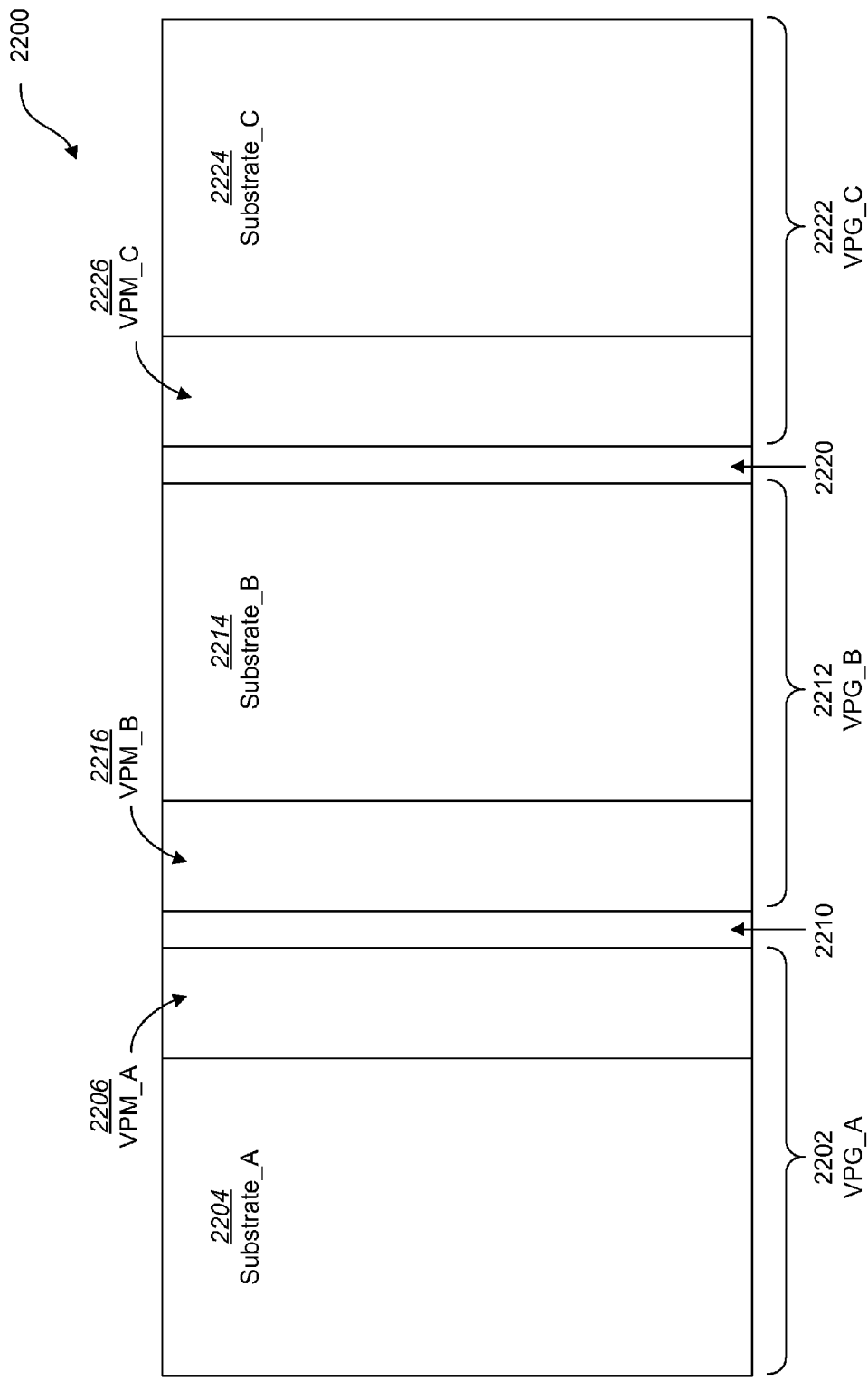
FIG. 22 is a cross-sectional view of a further embodiment of a multi-HOE grating.

FIG. 22 is a cross-sectional view of a further embodiment of a multi-HOE grating 2200 that includes VPG_A 2202 (comprising substrate_A 2204 and volume phase medium_A 2206), VPG_B 2212 (comprising substrate_B 2214 and volume phase medium_B 2216), VPG_C 2222 (comprising substrate_C 2224 and volume phase medium_C 2226), transparent, index matched glue (or other transparent, index matched adhesive) 2210 between medium_A 2206 and medium_B 2216, and transparent, index matched glue (or other transparent, index matched adhesive) 2220 between substrate_B 2214 and medium_C 2226. Each of the media 2206, 2216, 2226 may be a hologram composed of dichromated gelatin ("DCG") having a periodically modulated refractive index.

In the present embodiment, VPG_A 2202, VPG_B 2212, and VPG_C 2222 are all non-symmetric non-Dickson gratings. In other embodiments, one of the gratings 2202, 2212, 2222 may be a non-symmetric Dickson grating while the two remaining gratings may be non-symmetric non-Dickson gratings. In further embodiments, VPG_A 2202 and VPG_C 2222 may be non-symmetric Dickson gratings while the remaining grating, VPG_B 2212, may be a non-symmetric non-Dickson grating. Typically, two Dickson gratings may not be used in series without a prism or other optical element, for example a wedge element such as a prism, to prevent total internal reflection of incoming radiation. It may be possible that VPG_A 2202, VPG_B 2212, and VPG_C 2222 are all symmetric Dickson gratings.

In some embodiments, VPG_A 2202, VPG_B 2212, and VPG_C 2222 have substantially the same spatial frequency. In other embodiments, the VPGs 2202, 2212, 2222 have different spatial frequencies.

The multi-HOE grating 2200 of FIG. 22 can be oriented so that the radiation to be dispersed thereby is incident either at substrate_A 2204 (in which case we refer to VPG_A 2202 as the "first" grating and VPG_C 2222 as the "last" grating) or substrate_C 2224 (in which case we refer to VPG_C 2222 as the "first" grating and VPG_A 2202 as the "last" grating). The Bragg planes of the media 2206, 2216, 2226 typically should have relative orientation such that the exit beam angle of the first grating matches the entrance beam angle of VPG_B 2212 and the exit beam angle of VPG_B 2212 matches the entrance beam angle of the last grating. If it is desired that the exit beam aspect ratio is the same as that of the entrance beam, the exit beam angle of the last grating should match the entrance beam angle of the first grating.

Figure 23:
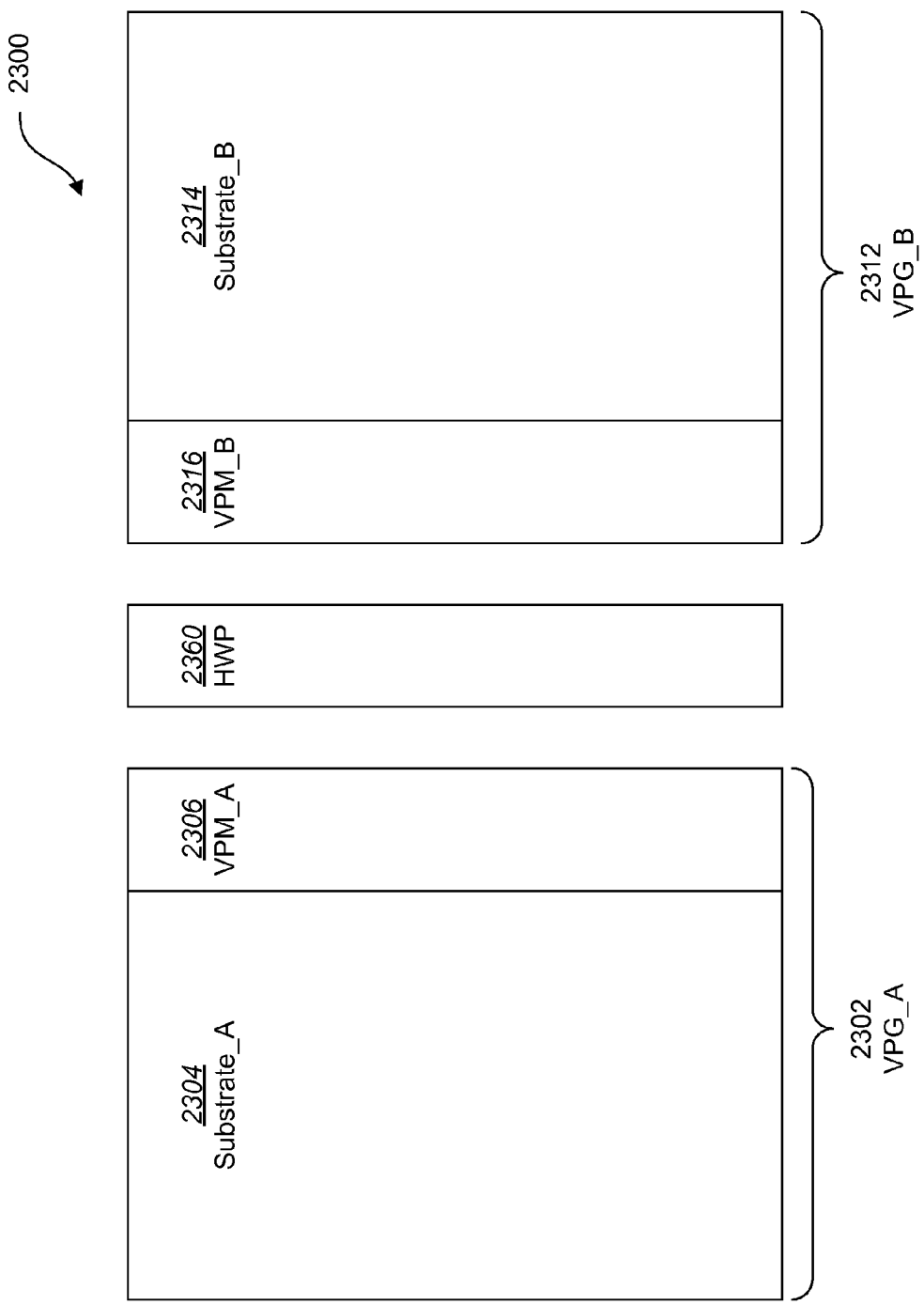
FIG. 23 is a cross-sectional view of an additional embodiment of a multi-HOE grating.

FIG. 23 is a cross-sectional view of an additional embodiment of a multi-HOE grating 2300 that includes VPG_A 2302 (comprising substrate_A 2304 and volume phase medium_A 2306), VPG_B 2312 (comprising substrate_B 2314 and volume phase medium_B 2316), and a half wave plate 2360 between the volume phase media 2306, 2316. Each of the media 2306, 2316 may be a hologram composed of dichromated gelatin ("DCG") having a periodically modulated refractive index. In the present embodiment, VPG_A 2302 and VPG_B 2312 are both non-symmetric non-Dickson gratings.

In some embodiments, VPG_A 2302 and VPG_B 2312 have substantially the same spatial frequency. In other embodiments, VPG_A 2302 and VPG_B 2312 have different spatial frequencies.

The half wave plate 2360 may rotate the polarization of the radiation between VPG_A 2302 and VPG_B 2312. Rotating the polarization of the radiation between the two gratings 2302, 2312 may reduce the effective PDL of the multi-HOE grating 2300.

In one embodiment, VPG_A 2302 of FIG. 23 is a non-symmetric non-Dickson grating with a spatial frequency of 470 lines per mm and VPG_B 2302 is also a non-symmetric non-Dickson grating with a spatial frequency of 470 lines per mm. The present embodiment of a multi-HOE grating 2300, as shown in FIG. 23, may provide at least as much dispersion as (and has insertion loss and PDL less than) a single Dickson grating having a spatial frequency of 940 lines per mm, which is designed for diffracting the same radiation and so that its internal angle of diffraction $\beta$ satisfies equation (7). The theoretical worst case PDL of such combination of two 470 lpmm non-Dickson gratings is about 0.025 dB, whereas the theoretical worst case PDL of a 940 line per mm Dickson grating is about 0.05 dB. Because the effective PDL for this embodiment is about half the PDL of a 940 lpmm Dickson grating, optimized antireflection (AR) coatings may be used to increase the effective PDL of the multi-HOE grating 2300.

Figure 24:
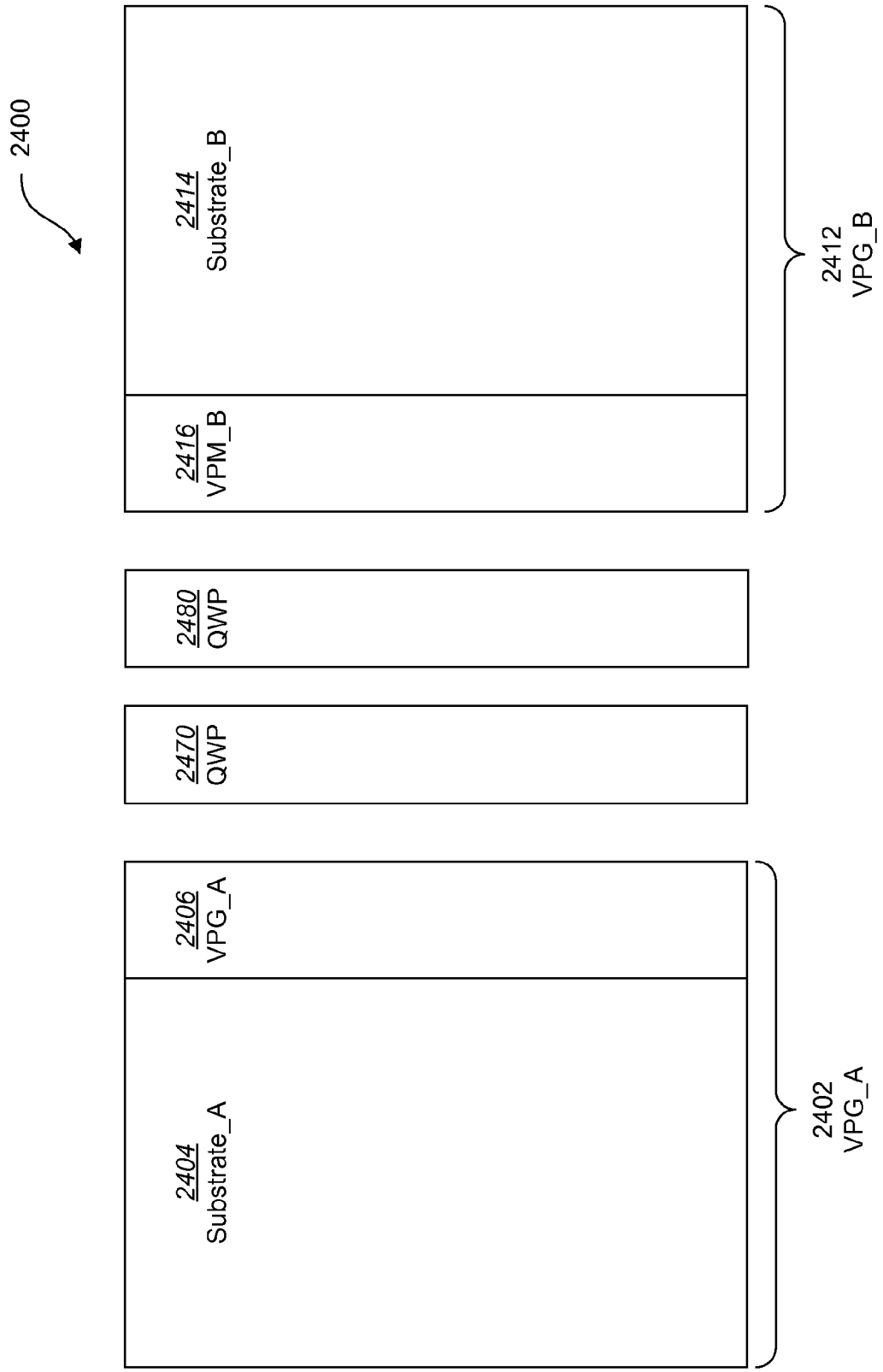
FIG. 24 is a cross-sectional view of a further embodiment of a multi-HOE grating.

FIG. 24 is a cross-sectional view of a further embodiment of a multi-HOE grating 2400 that includes VPG_A 2402 (comprising substrate_A 2404 and volume phase medium_A 2406), VPG_B 2412 (comprising substrate_B 2414 and volume phase medium_B 2416), and two quarter wave plates 2470, 2480 between the volume phase media 2406, 2416. Each of the media 2406, 2416 may be a hologram composed of dichromated gelatin ("DCG") having a periodically modulated refractive index. In the present embodiment, VPG_A 2402 and VPG_B 2412 are both non-symmetric non-Dickson gratings.

In some embodiments, VPG_A 2402 and VPG_B 2412 have substantially the same spatial frequency. In other embodiments, VPG_A 2402 and VPG_B 2412 have different spatial frequencies.

The quarter wave plates 2470, 2480, like the half wave plate 2360 of FIG. 23, may rotate the polarization of the radiation (typically light) between VPG_A 2402 and VPG_B 2412. Rotating the polarization of the radiation between the two gratings 2402, 2412 may reduce the effective PDL of the multi-HOE grating 2400. In alternative embodiments, the half wave plate 2360 of FIG. 23 or the quarter wave plates 2470, 2480 may be replaced with other wave plates, such that the polarization of the radiation between the two gratings 2402, 2412 may be rotated to reduce the effective PDL of the multi-HOE grating 2400.

Figure 25:
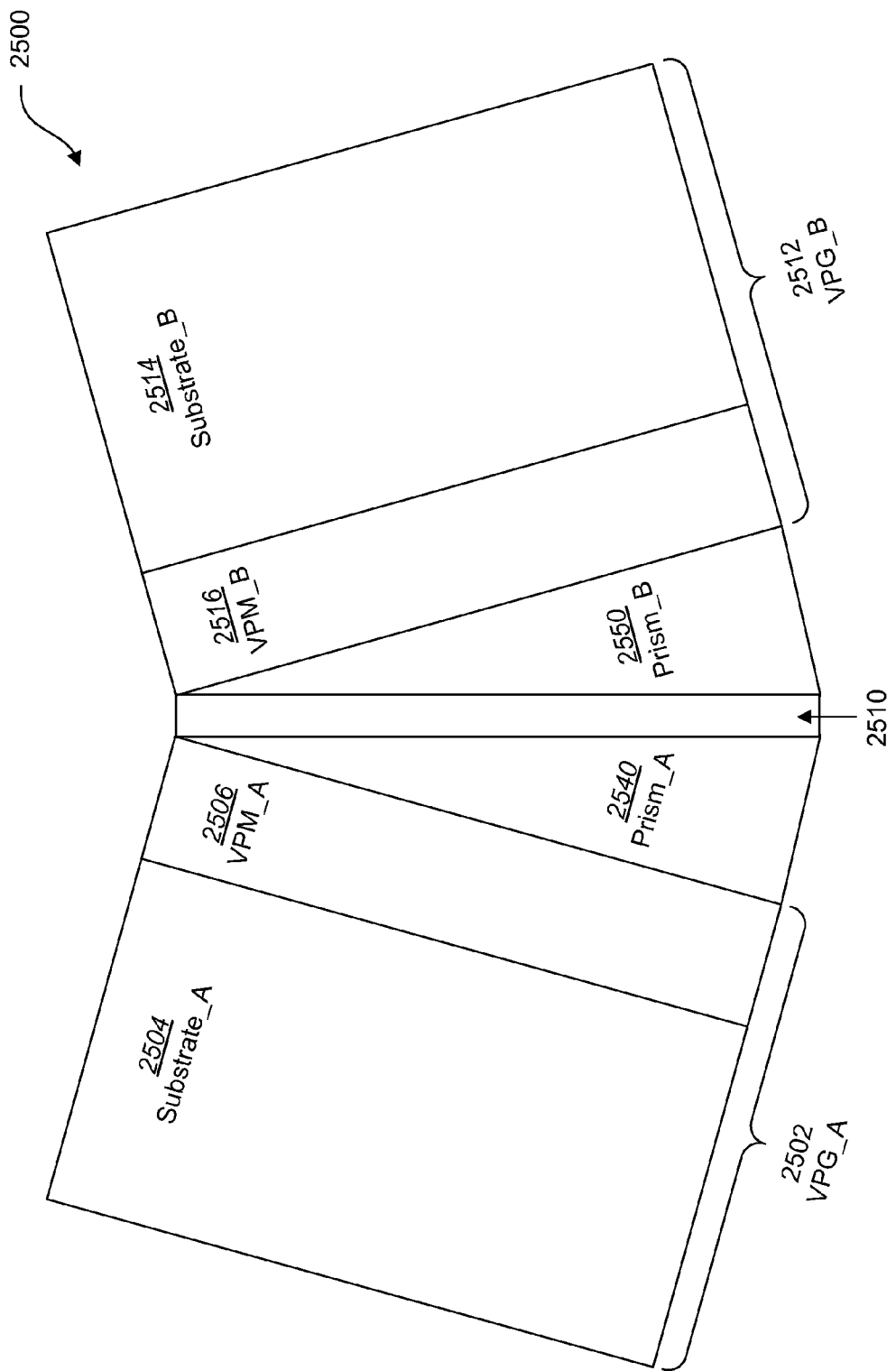
FIG. 25 is a cross-sectional view of another embodiment of a multi-HOE grating.

FIG. 25 is a cross-sectional view of another embodiment of a multi-HOE grating 2500 that includes VPG_A 2502 (comprising substrate_A 2504, volume phase medium_A 2506, and capping prism_A 2540), VPG_B 2512 (comprising substrate_B 2514, volume phase medium_B 2516, and capping prism_B 2550), and transparent, index matched glue (or other transparent, index matched adhesive) 2510 between the prisms 2540, 2550. Each of the media 2506, 2516 may be a hologram composed of dichromated gelatin ("DCG") having a periodically modulated refractive index. In other embodiments, Prism_A 2540, Prism_B 2550, and adhesive layer 2510 may be replaced with a single prism.

In some embodiments, VPG_A 2502 and VPG_B 2512 have substantially the same spatial frequency. In other embodiments, VPG_A 2502 and VPG_B 2512 have different spatial frequencies. In some embodiments, VPG_A 2502 and VPG_B 2512 are both non-symmetric non-Dickson gratings. In other embodiments, VPG_A 2502 and VPG_B 2512 are both non-symmetric Dickson gratings.

The multi-HOE grating 2500 of FIG. 25 may be oriented so that the radiation to be dispersed thereby is incident at either substrate_A 2504 (in which case we refer to VPG_A 2502 as the "first" grating and VPG_B 2512 as the "last" grating) or substrate_B 2514 (in which case we refer to VPG_B 2512 as the "first" grating and VPG_A 2502 as the "last" grating). The Bragg planes of the media 2506, 2516 typically should have relative orientation such that the exit beam angle of the first grating matches the entrance beam angle of the last grating. If it is desired that the exit beam aspect ratio is the same as that of the entrance beam, the exit beam angle of the last grating should match the entrance beam angle of the first grating.

Figure 26:
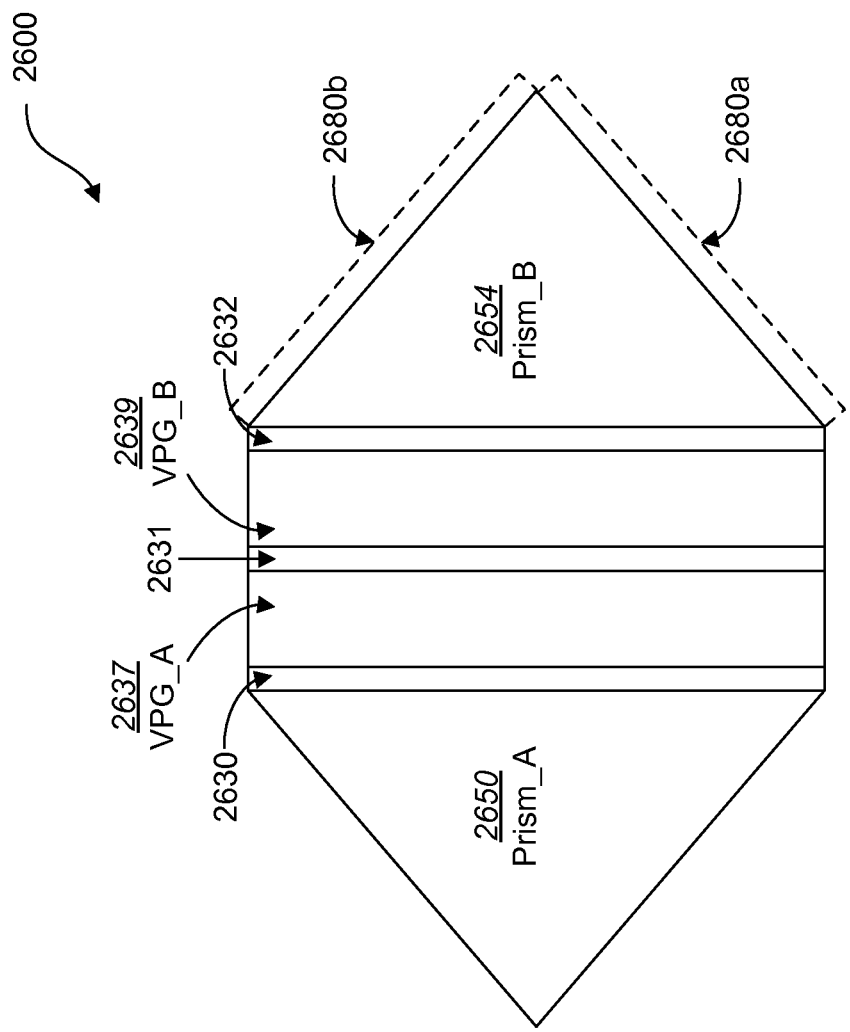
FIG. 26 is a cross-sectional view of an embodiment of a multi-HOE grating.

FIG. 26 is a cross-sectional view of an embodiment of a multi-HOE grating 2600 including prism_A 2650, prism_B 2654, VPG_A 2637, VPG_B 2639, transparent, index matched glue (or other transparent, index matched adhesive) 2630 between prism_A 2650 and VPG_A 2637, transparent, index matched glue (or other transparent, index matched adhesive) 2631 between VPG_A 2637 and VPG_B 2639, and transparent, index matched glue (or other transparent, index matched adhesive) 2632 between VPG_B 2639 and prism_B 2654. Each of the gratings 2637, 2639 may be a hologram composed of dichromated gelatin ("DCG") having a periodically modulated refractive index.

Both prisms 2650, 2654, in the present embodiment, are transparent, and consist of fused silica. In some embodiments the multi-HOE grating 2600 may include prisms 2650, 2654 consisting of other materials. In further embodiments, both prisms 2650, 2654 of FIG. 26 are minor images of each other (with identical prism angles and refractive indices).

In some embodiments, VPG_A 2637 and VPG_B 2639 have substantially the same spatial frequency. In other embodiments, VPG_A 2637 and VPG_B 2639 have different spatial frequencies. In some embodiments, VPG_A 2637 and VPG_B 2639 are both non-symmetric non-Dickson gratings. In other embodiments, VPG_A 2637 and VPG_B 2639 are both non-symmetric Dickson gratings.

In some embodiments, the multi-HOE grating 2600 can be implemented as a reflective grating if at least one of the optional mirrors 2680a, 2680b (shown in phantom view in FIG. 26) is affixed to the a surface of prism_B 2654, as shown. The correct surface typically depends on the orientation of the fringes in VPG_A 2637 and VPG_B 2639. In these embodiments, the overall device may be useful in a reflective, double pass mode in which radiation propagates through prism_A 2650, VPG_A 2637, VPG_B 2639, and prism_B 2654, then reflects from at least one of the mirrors 2680a, 2680b, and then propagates back through the prism_B 2654, VPG_B 2639, VPG_A 2637, prism_A 2650 (exiting the device from prism_A 2650).

Other embodiments of the multi-HOE grating 2600 shown in FIG. 26 may be designed to provide the same dispersion that can be provided by a single VPG (designed and used for diffracting the same radiation) having a spatial frequency of (A+B) lines per mm. Each such embodiment of a multi-HOE grating may include a volume phase grating having spatial frequency "A" lines per mm and another volume phase grating having spatial frequency "B" lines per mm.

Some embodiments have been presented with optional mirrors to create reflective gratings. Many embodiments presented in the Figures may be converted to reflective multi-HOE gratings by adding an optional mirror. For ease of presentation, optional mirrors have only been presented in some of the embodiments.

Typically, each constituent grating of the inventive multi-HOE grating is a holographic grating whose volume phase material is a hologram consisting essentially of dichromated gelatin ("DCG"). Alternatively, the constituent gratings of the inventive multi-HOE grating may consist of material and/or have structure other than the material and/or structure of the gratings of such typical embodiments. For example, in some embodiments, at least one constituent grating may include or consist of a suitable polymer or Lithium Niobate. In other embodiments, constituent elements of the inventive grating need not be (and are not) bonded together (e.g., by optical cement or otherwise), and/or the constituent elements (or the overall device) need not be (and are not) sealed. In various embodiments, the substrate and/or cover materials of the inventive multi-HOE grating may include (or consist of) plastic, glass or other suitable material, which is typically (but need not be) transparent. In further embodiments, the inventive multi-HOE grating may not require (and does not include) a substrate and/or cover material to support and/or protect its constituent gratings.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A multi-holographic optical element (HOE) grating, comprising:
    a first volume phase grating having a first spatial frequency of "A" lines per mm; and
    a second volume phase grating having a second spatial frequency of "B" lines per mm;
    wherein the first volume phase grating and the second volume phase grating are positioned relative to each other such that radiation propagates through and is diffracted by the first volume phase grating and the second volume phase grating;
    wherein the first volume phase grating and the second volume phase grating are not tilted with respect to each other; and
    wherein the multi-HOE grating provides at least as much dispersion and has less polarization dependent loss (PDL) than a single grating having a spatial frequency of "A+B" lines per mm.

2. The multi-HOE grating of claim 1, wherein the first volume phase grating and the second volume phase grating are both non-symmetric non-Dickson gratings.

3. The multi-HOE grating of claim 1, wherein A equals B, such that the first volume phase grating and the second volume phase grating have substantially the same spatial frequency.

4. The multi-HOE grating of claim 1, wherein A does not equal B, such that the first volume phase grating and the second volume phase grating have different spatial frequencies.

5. The multi-HOE grating of claim 1, wherein Bragg planes of the first volume phase grating and the second volume phase grating have relative orientation such that:
    an entrance beam angle of the first volume phase grating matches an exit beam angle of the second volume phase grating; and
    an exit beam angle of the first volume phase grating matches an entrance beam angle of the second volume phase grating.

6. The multi-HOE grating of claim 1, wherein:
    the first volume phase grating comprises a first substrate and a first volume phase medium; and
    the second volume phase grating comprises a second substrate and a second volume phase medium.

7. The multi-HOE grating of claim 6, wherein the first volume phase medium is bonded directly to the second volume phase medium, such that only a layer of transparent adhesive having substantially uniform thickness separates the first volume phase medium from the second volume phase medium.

8. The multi-HOE grating of claim 6, wherein:
    the first volume phase grating further comprises a first flat cap;
    the second volume phase grating further comprises a second flat cap; and
    the multi-HOE grating further comprises transparent, index-matched adhesive between the first flat cap and the second flat cap.

9. The multi-HOE grating of claim 1, further comprising a half wave plate between the first volume phase grating and the second volume phase grating.

10. The multi-HOE grating of claim 1, further comprising two quarter wave plates between the first volume phase grating and the second volume phase grating.

11. The multi-HOE grating of claim 1, further comprising a mirror affixed to the second volume phase grating, wherein the mirror is positioned such that radiation:
    propagates through the first and second volume phase gratings;
    reflects from the mirror; and
    propagates back through the second and first volume phase gratings.

12. The multi-HOE grating of claim 1, further comprising:
    a first prism;
    a second prism;
    first transparent, index-matched adhesive between the first prism and the first volume phase grating;
    second transparent, index-matched adhesive between the first volume phase grating and the second volume phase grating; and
    third transparent, index-matched adhesive between the second volume phase grating and the second prism.

13. The multi-HOE grating of claim 12, wherein the second prism is a mirror image of the first prism.

14. The multi-HOE grating of claim 12, further comprising a mirror affixed to a surface of the second prism, wherein the mirror is positioned such that radiation:
    propagates through the first prism, the first and second volume phase gratings, and the second prism;
    reflects from the mirror; and
    propagates back through the second prism, the second and first volume phase gratings, and the first prism.

* * * * *